United States Patent
Ghasemi et al.

(10) Patent No.: US 10,572,225 B1
(45) Date of Patent: Feb. 25, 2020

(54) CIRCUIT ARRANGEMENTS AND METHODS FOR PERFORMING MULTIPLY-AND-ACCUMULATE OPERATIONS

(71) Applicant: Xilinx, Inc., San Jose, CA (US)

(72) Inventors: Ehsan Ghasemi, San Jose, CA (US); Elliott Delaye, San Jose, CA (US); Ashish Sirasao, San Jose, CA (US); Sean Settle, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/142,406

(22) Filed: Sep. 26, 2018

(51) Int. Cl.
| G06F 7/544 | (2006.01) |
| G06N 3/02 | (2006.01) |
| G06T 1/60 | (2006.01) |
| G06N 3/08 | (2006.01) |

(52) U.S. Cl.
CPC .......... *G06F 7/5443* (2013.01); *G06N 3/02* (2013.01); *G06N 3/08* (2013.01); *G06T 1/60* (2013.01); *G06T 2207/20084* (2013.01)

(58) Field of Classification Search
CPC ...... G06N 3/02–04; G06N 3/06; G06N 3/063; G06F 7/5443; G06T 1/20; G06T 1/60; G06T 2207/20084
See application file for complete search history.

(56) References Cited

U.S. PATENT DOCUMENTS

| 6,346,825 B1 | 2/2002 | Pang et al. | |
| 10,411,709 B1* | 9/2019 | Ghasemi | H03K 19/17704 |
| 2018/0189643 A1* | 7/2018 | Kim | G06K 9/4628 |
| 2019/0164037 A1* | 5/2019 | Kim | G06N 3/0454 |
| 2019/0266479 A1* | 8/2019 | Singh | G06F 17/175 |
| 2019/0266485 A1* | 8/2019 | Singh | G06N 3/063 |

OTHER PUBLICATIONS

Akesson, Benny, "An introduction to SDRAM and memory controllers," downloaded Sep. 25, 2017 from http://www.es.ele.tue.nl/premadonaThles/akesson01.pdf, pp. 1-30, Eindhoven University of Technology, Eindhoven, The Netherlands.

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

(Continued)

*Primary Examiner* — Matthew D Sandifer
(74) *Attorney, Agent, or Firm* — LeRoy D. Maunu

(57) ABSTRACT

A and a request generator circuit is configured to read data elements of a three-dimensional (3-D) input feature map (IFM) from a memory and store a subset of the data elements in one of a plurality of N line buffers. Each line buffer is configured for storage of M data elements. A pixel iterator circuit is coupled to the line buffers and is configured to generate a sequence of addresses for reading the stored data elements from the line buffers based on a sequence of IFM height values and a sequence of IFM width values.

20 Claims, 25 Drawing Sheets

(56) References Cited

OTHER PUBLICATIONS

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.

Mathworks, "im2col," dowloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institute of Technology, Rochester, New York, USA.

Stanford, "CS231n Convolutional Neural Networks for Visual Recognition," downloaded Sep. 25, 2017 from http://cs231n.stanford.edu/, pp. 1-23, Stanford University, Stanford, California, USA.

Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikpedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

Specification and drawings for U.S. Appl. No. 15/989,075, filed May 24, 2018, Ghasemi et al.

\* cited by examiner

CIRCUIT ARRANGEMENTS AND METHODS FOR PERFORMING MULTIPLY-AND-ACCUMULATE OPERATIONS

TECHNICAL FIELD

The disclosure generally relates to performing multiply-and-accumulate (MAC) operations.

BACKGROUND

Convolutional neural networks (CNNs) are used in a variety of applications, including for example, image processing. Convolution operations include a summation of each element of an input feature map (IFM) with neighboring elements that are weighted by a filter, which is also referred to as a kernel.

CNNs include multiple layers in which each layer performs a convolution operation on a three-dimensional volume that includes multiple sets of two-dimensional IFMs. In CNN implementations involving Graphic Processing Units (GPUs), the GPU restructures the convolution operation as a matrix multiplication operation by extracting local neighboring elements that contribute to each element of the IFM and expanding the volume into matrix format before performing the matrix multiplication. The out-of-order access pattern for extracting the local neighboring elements is limited by the memory available for static expansion of the IFM. Because of the high ratio of computational capacity to memory in field programmable gate arrays (FPGAs), static expansion of the volume is not feasible in FPGA accelerators due to the latency and bandwidth limitations required to run the FPGA at high efficiency.

SUMMARY

A disclosed circuit arrangement includes a request generator circuit that is configured to read data elements of a three-dimensional (3-D) input feature map (IFM) from a memory and store a subset of the data elements in one of a plurality of N line buffers. Each line buffer is configured for storage of M data elements. A pixel iterator circuit is coupled to the line buffers and is configured to generate a sequence of addresses for reading the stored data elements from the line buffers based on a sequence of IFM height values and a sequence of IFM width values.

A disclosed method includes storing a three-dimensional (3-D) input feature map (IFM) in a memory and reading a subset of data elements of the 3-D IFM from the memory by a request generator circuit. The subset of data elements is stored in one of a plurality of N line buffers. Each line buffer is configured for storage of M data elements. A pixel iterator circuit generates read requests to the line buffers. The read requests contain a sequence of addresses referencing the stored data elements in the line buffers, and the sequence of addresses is based on a sequence of IFM height values and a sequence of IFM width values. An array of multiply-and-accumulate (MAC) circuits performs multiple consecutive MAC operations on the data elements read from the line buffers and respective elements of a kernel.

Other features will be recognized from consideration of the Detailed Description and Claims, which follow.

BRIEF DESCRIPTION OF THE DRAWINGS

Various aspects and features of the circuit arrangement and method will become apparent upon review of the following detailed description and upon reference to the drawings in which:

FIG. 15A shows an exemplary 2-D plane of an IFM sub-volume;

FIG. 15B shows an exemplary arrangement of the data elements of the 2-D plane of FIG. 15A in one of the N line buffers of FIG. 1;

FIGS. 16A and 6B show an exemplary traversal of the 2-D plane of an IFM sub-volume of FIG. 15A by the pixel iterator circuit of FIG. 12.

DETAILED DESCRIPTION

Figure 1:
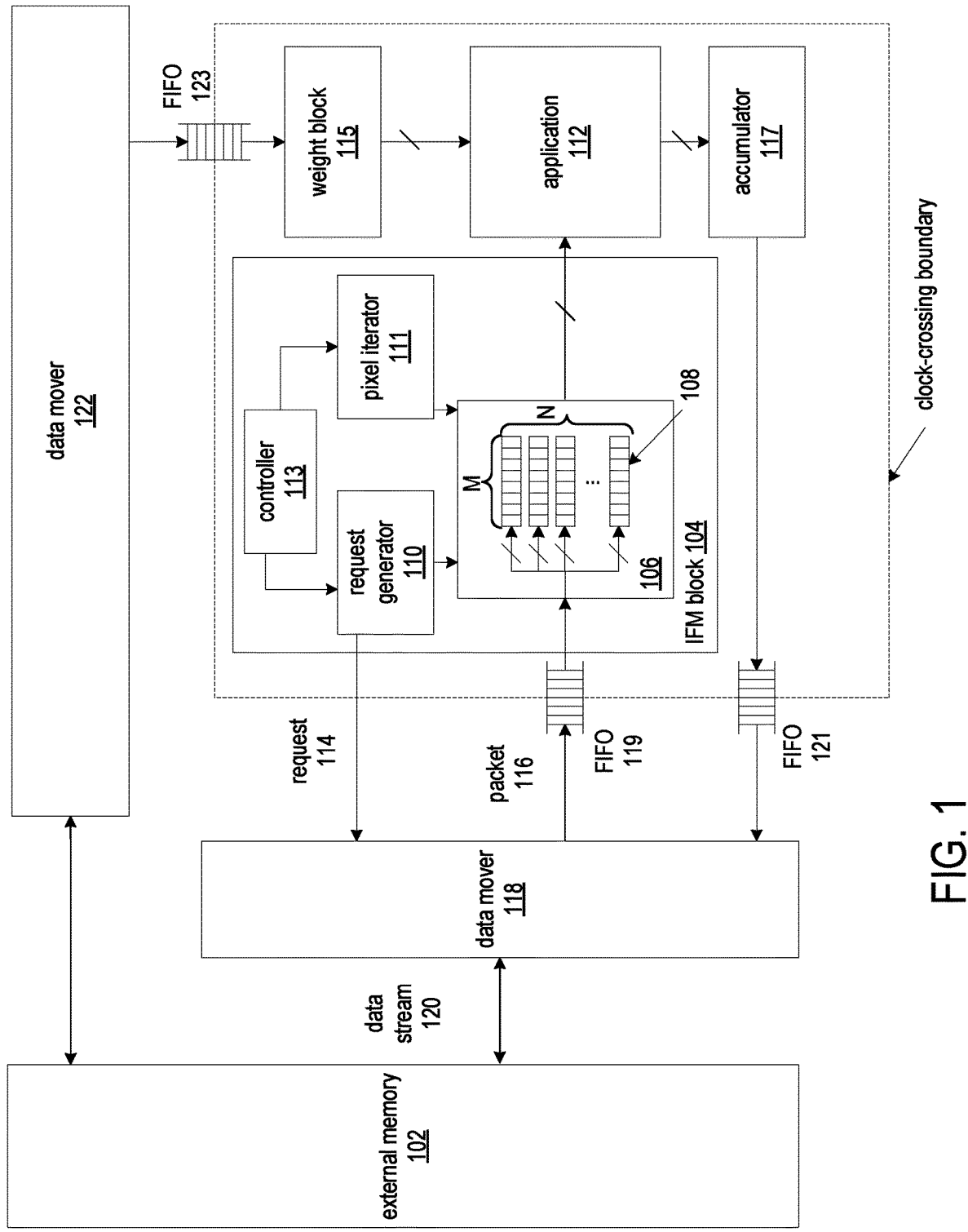
FIG. 1 shows an exemplary circuit arrangement including a request generator circuit and a pixel iterator circuit.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The configuration of CNNs (e.g., number of layers, image size, layer dimensions, etc.) varies widely across different applications. Central Processing Units (CPUs) and Graphics Processing Units (GPUs) are commonly used for implementing CNNs. However, these platforms lack the high-performance and low-power necessary for CNN processing in embedded and data-center environments. Some previous approaches are optimized and limited toward a specific CNN.

A challenge in designing a generic CNN processor is partitioning data and computation while maintaining efficiency for different configurations of CNNs. Some previous approaches include restructuring the problem as matrix multiplication by expanding the IFMs into matrix format and using a two-dimensional (2-D) array of multiply-and-accumulate (MAC) circuits to perform MAC operations in hardware. Static expansion of IFMs increases the latency of the CNN and reduces the overall performance of the CNN. In addition, static expansion of IFMs requires the array of MAC circuits to have a higher bandwidth than is feasible on an FPGA. These previous approaches introduce a compute-bandwidth imbalance that causes the array of MAC circuits to be under-utilized and the performance of the array of MAC circuits to be limited by the maximum memory bandwidth of the FPGA.

Some previous approaches circumvent the aforementioned problems by performing dynamic expansion of IFMs in hardware. However, designing a generic CNN processor for dynamic expansion of IFMs is not feasible. For example, a unified control structure would have to consider the vast variety of custom parameters for different configurations of CNNs in order to efficiently handle different configurations of CNNs. Also, tiling the problem scope into smaller tasks that are compiler friendly is difficult because of the out-of-order memory accesses required for performing MAC operations. As a result, some previous approaches include creating a custom dynamic expansion circuit for a specific set of parameters of a particular CNN that is not scalable and cannot be used if any of the parameters of the CNN change.

CNNs include multiple layers and each layer is connected to a previous layer. Each layer inputs a three-dimensional (3-D) IFM that includes multiple 2-D planes. Each 2-D plane has a height and a width. The number of 2-D planes of a 3-D IFM is referred to as the depth of the 3-D IFM. Each layer of a CNN outputs another 3-D volume, hereinafter referred to as a 3-D output feature map (OFM). The size of the 3-D OFM output by a layer is dependent on the size of the filter, hereinafter referred to as a kernel, applied to the 3-D IFM input to the layer.

As explained above, previous approaches utilize custom CNNs for specific application domains. Each CNN incorporates multiple layers having dimensions that are customized for classifying a set of images, for example. However, using customized dimensions for different layers of a CNN increases the resource requirements for data transfers between an external memory and custom accelerators, as there is limited local storage in an FPGA on which custom accelerators can be implemented. Partitioning the problem scope into smaller tasks is difficult because of the out-of-order memory access associated with the custom dimensions.

Some previous approaches store an entire 3-D IFM in a large memory. However, those approaches may not be suitable for FPGA accelerators as FPGAs may not have sufficient local storage for an entire 3-D IFM. Previous approaches are customized for specific applications and are not scalable. Previous approaches are also limited by the size of the local storage coupled to a CNN. Small FPGAs do not have local storage sufficient for storing an entire 3-D IFM for processing by a CNN. And even if an FPGA has sufficient storage, loading an entire 3-D IFM prior to processing increases the latency and introduces an imbalance between the bandwidth of the external memory and the bandwidth of an array of multiply-and-accumulate (MAC) circuits of a CNN.

Because static expansion of IFMs in CNNs have not been practical for FPGA accelerators as explained above, some previous approaches dynamically expand the IFM. Previous approaches for dynamic expansion of an IFM include a custom feeder circuit including a network of shift-registers, multiplexers, and random access memory blocks (BRAMs) suitable for specific values of IFM height, IFM width, kernel height, kernel width, pad, and stride parameters of the expansion. Because a feeder circuit is fixed for specific values of parameters of the expansion, a different custom feeder circuit must be generated statically for any variation in any of the values of the parameters. Thus, in a CNN, a specific, custom feeder circuit must be generated for each layer. In some previous approaches, the feeder structure for a CNN can include an individual, custom feeder circuit for each and every layer of the CNN. Custom feeder circuits inefficiently utilize resources of an FPGA because a separate feeder circuit is generated for each layer. Additionally, previous approaches lack scalability because available resources of the FPGA decrease as the number of layers of a CNN increases. An FPGA may not have sufficient resources on which to implement all the feeder circuits for all the layers of the CNN. Moreover, a feeder structure generated according to previous approaches only supports the specific CNN based on specific values of the parameters of the expansion for which the feeder structure was generated.

The disclosed circuit arrangements and methods provide approaches for implementing CNNs using an FPGA. The disclosed circuit arrangements and methods reduce resource requirements and provide a high-performance architecture that is compatible with any number and/or type of layers of a CNN. Implementations of the present disclosure include a hardware-implemented dataflow engine that can be pragmatically configured based on available resources on an FPGA and scaled to support any size of CNN. The dataflow engine performs out-of-order external memory accesses and handles large problems by dividing tasks into sub-tasks.

The disclosed approaches include iterating through a 3-D IFM while maintaining a balance between the size of the external memory and the bandwidth of an array of MAC circuits of a CNN. The disclosed approaches include dividing a 3-D IFM into a plurality of IFM sub-volumes based on the available local storage and the dimensions of the IFM. In contrast to previous approaches, the disclosed approach is scalable, area-efficient, and/or adaptable to any set of CNN layers, regardless of the size of the 3-D IFM. The maximum size of an IFM sub-volume is based on the available local storage that can be assigned programmatically, thereby making the disclosed approaches device independent.

At least one implementation provides runtime programmable support for dividing any 3-D IFM. The values of the parameters for dividing a 3-D IFM can be set at runtime. Thus, the same circuit arrangement can be adapted to support multiple layers of a CNN, such as a MAXPOOL layer and/or an average pool layer. The disclosed approaches can be used in applications other than image processing, such as those involving traversal in a one-dimensional or two-dimensional spatial domain. For example, the disclosed approaches can be used for machine learning, Deep Neural Networks (DNNs), Long-Short Term Memory (LSTM), video processing, image processing, vision applications, and General Matrix Multiplication.

The disclosed approaches are scalable, area-efficient, and/or adaptable to variation in any of the values of the parameters of a CNN (e.g., IFM height, IFM width, kernel height, kernel width, pad, stride). The pixel iterator supports any variation in values of the parameters of the expansion input to the pixel iterator. At least one implementation provides runtime programmable support for any traversal pattern in a two-dimensional spatial domain (e.g., a 2-D plane of an IFM sub-volume). The values of the input parameters can be set at runtime to change the size and the order of the traversal pattern. Thus, the same pixel iterator circuit can be adapted to support multiple layers of a CNN, such as a MAXPOOL layer and/or an average pool layer. The pixel iterator circuit can be used in applications other than image processing, such as those involving traversal in a one-dimensional or 2-D spatial domain. The pixel iteration circuit enables automatic adjustment of a value of an input parameter with minimal area overhead. For example, the pixel iterator circuit can be used with a CNN having a maximum image size of ten pixels (a maximum IFM size of ten data elements) that uses three bits for calculation. The same pixel iterator circuit can be used with a CNN having a maximum image size of 1,024 pixels (a maximum IFM size of 1,024 data elements) that uses ten bits for calculation. The pixel iterator circuit can serve as a building block of a large application, such as CNNs or matrix multiplication. In contrast to previous approaches for dynamic expansion where the feeder structure is inextricably linked to the number of the MAC circuits of a CNN, the disclosed approaches enable a single pixel iterator circuit to be shared by all the MAC circuits, which reduces the area overhead and improves scalability.

The disclose approaches can include partitioning a 3-D IFM in the depth dimension. A 3-D IFM can be partitioned in the height and width dimensions so as to provide even more control over the bandwidth and computation requirements. The disclosed approaches improve task scheduling between multiple arrays of MAC circuits in hardware. For example, as the depth of a convolution problem increases, the compiler can choose to allocate multiple arrays of MAC circuits to contribute to computation of one convolution task by sharing the IFM bandwidth while using two separate sets of kernel elements for each array, or disjoin the computation by scheduling different convolution tasks on different arrays as described further in association with FIG. 5 below. The disclosed approaches enable the ability to create a set of micro-instructions, offline or online, to run a full CNN. Because no data reformatting is required to run consecutive convolution layers as described further in association with FIG. 3 below, the micro-instructions can be loaded into an external memory as a program. Each instruction can be handled by program counter without any software intervention.

The disclosed approaches improve the efficiency of the MAC circuitry. Efficiency can be quantified as the number of cycles to perform the convolution in the hardware divided by the number of cycles performing the convolution would have taken if the utilization of the processor circuit was 100%. For example, the disclosed approaches can process a 3-D IFM having a depth ranging from 25 to 32 using a 5×5 kernel with a 99% efficiency.

The disclosed approaches enable a CNN to be implemented using fewer resources than previous approaches. The low area consumption translates to fewer resources used on the fabric of an FPGA and provides lower dynamic power consumption. Hardened processor circuits and a cascaded adder chain can be used for performing most of the heavy computation thereby significantly improving power efficiency. Moreover, creating the adder cascade using hardwires of the processor circuits reduces the number of routing resources used in the fabric, further improving the power efficiency. The disclosed approaches can include using an element of a kernel for as many MAC operations as possible, which not only reduces the required memory bandwidth but also reduces the number of activation cycles for switching between the elements of a kernel, which reduces the overall power efficiency of the CNN.

For purposes of illustration, consider a local storage of an FPGA including a plurality of N line buffers, each of the N line buffers being configured for storage of M data elements of a 3-D IFM. There are three scenarios in which an entire 3-D IFM does not fit in the N line buffers. A first scenario is when the depth (ifm_d) of the 3-D IFM, which is also the number of 2-D planes of the 3-D IFM, is greater than N, but the number of data elements of each of the 2-D planes is less than or equal to M. The number of data elements of each of the 2-D planes is defined by multiplying the width (ifm_w) of the 2-D planes by the height (ifm_h) of the 2-D planes. As used herein, "width of the 2-D planes" is used interchangeably with "width of the 3-D IFM" and "height of the 2-D planes" is used interchangeably with "height of the 3-D IFM." The first scenario can be expressed as ifm_d>N and ifm_w*ifm_h M. Thus, the data elements of a 2-D plane will fit in one of the N line buffers, but there are more 2-D planes than there are line buffers. For the first scenario, the disclosed approaches include dividing the 3-D IFM into a plurality of IFM sub-volumes, where at least one IFM sub-volume is designated to include N of the 2-D planes (N of ifm_d). The disclosed approaches with respect to the first scenario are discussed further in association with FIG. 6 below.

A second scenario in which an entire 3-D IFM does not fit in the N line buffers is when the depth (ifm_d) of the 3-D IFM is less than or equal to N, but the number of data elements of each of the 2-D planes is greater than M. The second scenario can be expressed as ifm_d≤N and ifm_w*ifm_h>M. Thus, there is a line buffer for each 2-D plane of the 3-D IFM, but all the data elements of a 2-D plane will not fit in one of the line buffers. For the second scenario, the disclosed approaches include dividing the 3-D IFM into a plurality of IFM sub-volumes, where the IFM sub-volumes are designated to include a subset of data elements of a 2-D plane, based on at least one dimension of the 3-D IFM (e.g., ifm_w, ifm_h), at least one dimension of a kernel (e.g., height k_h, width k_w), and a stride of the MAC operations. The disclosed approaches with respect to the second scenario are discussed further in association with FIG. 7 below.

A third scenario in which an entire 3-D IFM does not fit in the N line buffers is when the depth of the 3-D IFM (ifm_d) is greater than N and the number of data elements of each of the 2-D planes is greater than M. The third scenario can be expressed as ifm_d>N and ifm_w*ifm_h>M. Thus, the data elements of a 2-D plane will not fit in one of the N line buffers and there are more 2-D planes than there are line buffers. For the third scenario, the disclosed approaches include dividing the 3-D IFM into a plurality of IFM sub-volumes, where the IFM sub-volumes are designated to include N of the 2-D planes (N of ifm_d) and a subset of data elements of the 2-D plane, based on at least one dimension of the 3-D IFM (e.g., ifm_w, ifm_h), at least one dimension of a kernel (e.g., k_h, k_w), and a stride of the MAC operations. The disclosed approaches with respect to the third scenario are discussed further in association with FIGS. 8A-8I below.

The pixel iterator circuit generates a sequence of addresses for traversing the data elements of an IFM sub-volume. The array of MAC circuits performs MAC operations on the data elements of the IFM sub-volume according to the sequence of addresses.

FIG. 1 shows an exemplary circuit arrangement including a request generator circuit 110 and a pixel iterator circuit 111. The request generator circuit 110 is coupled to a buffer circuit 106 including N line buffers 108. Each of the N line buffers 108 is configured for storage of M data elements of a 3-D IFM. The total available storage of the buffer circuit 106 is N×M. A control circuit 113 is coupled to the request generator circuit 110 and the pixel iterator circuit 111. The control circuit 113 coordinates different blocks and/or components of the circuit arrangement. The control circuit 113 is discussed further in association with FIGS. 9, 13, and 14. The request generator circuit 110, the pixel iterator circuit 111, the control circuit 113, and the buffer circuit 106 together can be referred to as an IFM block.

The request generator circuit 110 generates and transmits a read request 114 for a packet of data 116. The request generator circuit 110 is discussed further in association with FIG. 9 below. The packet of data 116 includes the data elements of one of the IFM sub-volumes. The size of the packet of data 116 can be determined programmatically and is based on the available storage of the buffer circuit 106 and one or more dimension of the 3-D IFM. The lower-bound of the size of the packet of data 116 is 1*N, which corresponds to a 3-D IFM where the width (ifm_w) of the 3-D IFM is 1, the height (ifm_h) of the 3-D IFM is 1, and the depth (ifm_d) of the 3-D IFM is less than or equal to N. The upper bound of the size of the packet of data 116 is M*N, which corresponds to a 3-D IFM where the number of data elements in each 2-D plane is less than or equal to M (ifm_h*ifm_w M) and the depth (ifm_d) of the 3-D IFM is less than or equal to N. Thus, if the size of the 3-D IFM is within the lower and upper bounds, then the entire 3-D IFM can fit in the local storage. However, if the 3-D IFM is larger than the upper bound, then the disclosed approaches include dividing the 3-D IFM into IFM sub-volumes based on the one or more dimensions of the 3-D IFM that exceeds a dimension of the buffer circuit 106 as explained above.

The request 114 includes a base address and a packet length for reading the data elements of an IFM sub-volume from an external memory 102, (e.g., double data rate (DDR) random-access memory (RAM)) that is coupled to the line buffers 108. The request generator circuit 110 enables storing the packet of data 116 in one of the N line buffers 108.

The pixel iterator circuit 111 is coupled to the buffer circuit 106. The pixel iterator circuit 111 traverses the N line buffers 108 by generating addresses to perform an out-of-order dynamic expansion of a 3-D IFM. In at least one implementation, the pixel iterator circuit 111 inserts padding when the traversal crosses a boundary of an IFM sub-volume (e.g., height, width). If the traversal is in-bounds, the data value(s) (e.g., indexed pixels) stored in the line buffer 108 at the address(es) generated by the pixel iterator circuit 111 is provided to an application 112, such as an array of MAC circuits.

The application 112 reads the packets of data 116 from the N line buffers 108 and performs operations (e.g., MAC operations) on the data elements of the IFM sub-volumes. The number of rows of MAC circuits in the application 112 can be equal to N. As explained further in association with FIGS. 6 and 8A-8I, each line buffer stores data elements of one 2-D plane of an IFM sub-volume. By having the number of rows of MAC circuits be equal to N, each row of MAC circuits performs MAC operations on the data elements of one 2-D plane of the IFM sub-volume.

In at least one implementation, the line-buffers 108 are double-buffered so that a packet of data including the data elements of a next IFM sub-volume is read from the external memory 102 while a packet of data including the data elements of another IFM sub-volume is being processed (e.g., read) by the application 112. The application 112 is coupled to a weight block 115 that includes control circuit for reading elements of kernels (also referred to as weights) from the external memory 102 via the data mover circuit 122.

The accumulator circuit 117 aggregates the partial summation propagating through the application 112. The results of the MAC operations of the columns of the array of MAC circuits are merged by the accumulator circuit 117 using a time-multiplexed adder and a local buffer for storing intermediate summation (discussed further in association with FIG. 3 below). The maximum number of partial accumulations that can be performed by the accumulator circuit is dependent on the size of the local buffer.

Another data mover circuit 118 translates the request 114 (e.g., to an Advanced Extensible Interface (AXI) request) and transmits the translated request to the external memory 102 via data stream 120. The data mover circuit 118 receives the requested packet of data 116 via the data stream 120 and transmits the requested packet of data to the N line buffers 108. The data mover circuit 118 translates the output of the accumulator circuit 117 (e.g., a 3-D OFM) and transmits the translated output to the external memory 102 via the data stream 120. The data mover circuits 118 and 122 serve as a unified interface between the external memory 102 and the other components of the circuit arrangement.

As shown in FIG. 1, First-In, First-Out (FIFO) buffers 119, 121, and 123 can define a clock-crossing boundary between the data mover circuits 118 and 122 and the external memory 102, and the IFM block 104, the weight block 115, the application 112, and the accumulator circuit 117.

Figure 2:
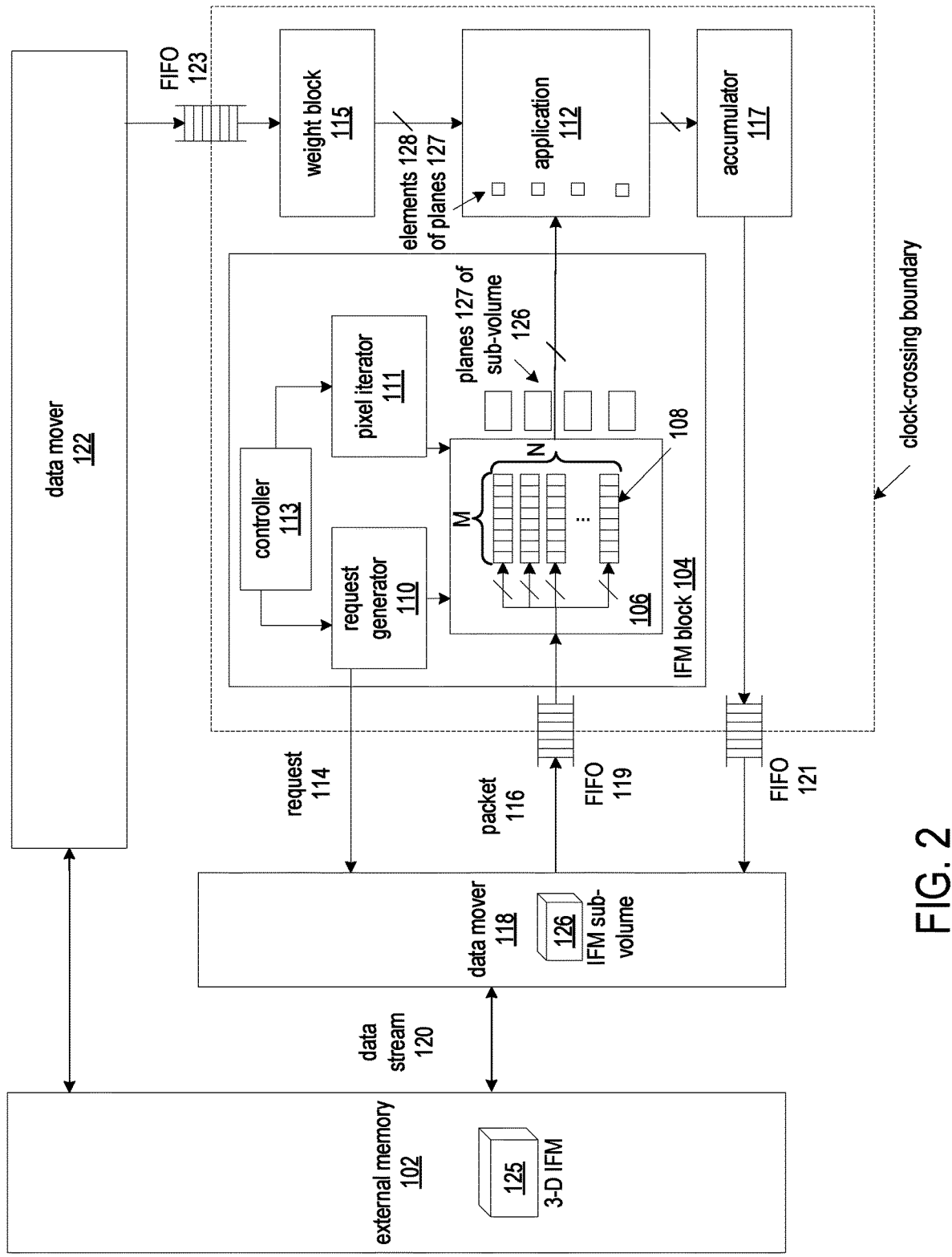
FIG. 2 shows an exemplary dataflow of an IFM sub-volume through the circuit arrangement of FIG. 1.

FIG. 2 shows an exemplary dataflow of an IFM sub-volume 126 through the circuit arrangement of FIG. 1. The external memory 102 stores a 3-D IFM 125. Based on the request 114, the data mover circuit 118 retrieves the IFM sub-volume 126. Each of the line buffers 108 stores a respective one of the 2-D planes 127 of the IFM sub-volume 126. IFM sub-volumes are discussed further in association with FIGS. 6-11 below. The application 112 performs MAC operations on data elements 128 of the 2-D planes 127 stored in the line buffers 108 according to the sequence of addresses generated by the pixel iterator circuit 111. The pixel iterator circuit 111 is discussed further in association with FIGS. 12-16B below.

Figure 3:
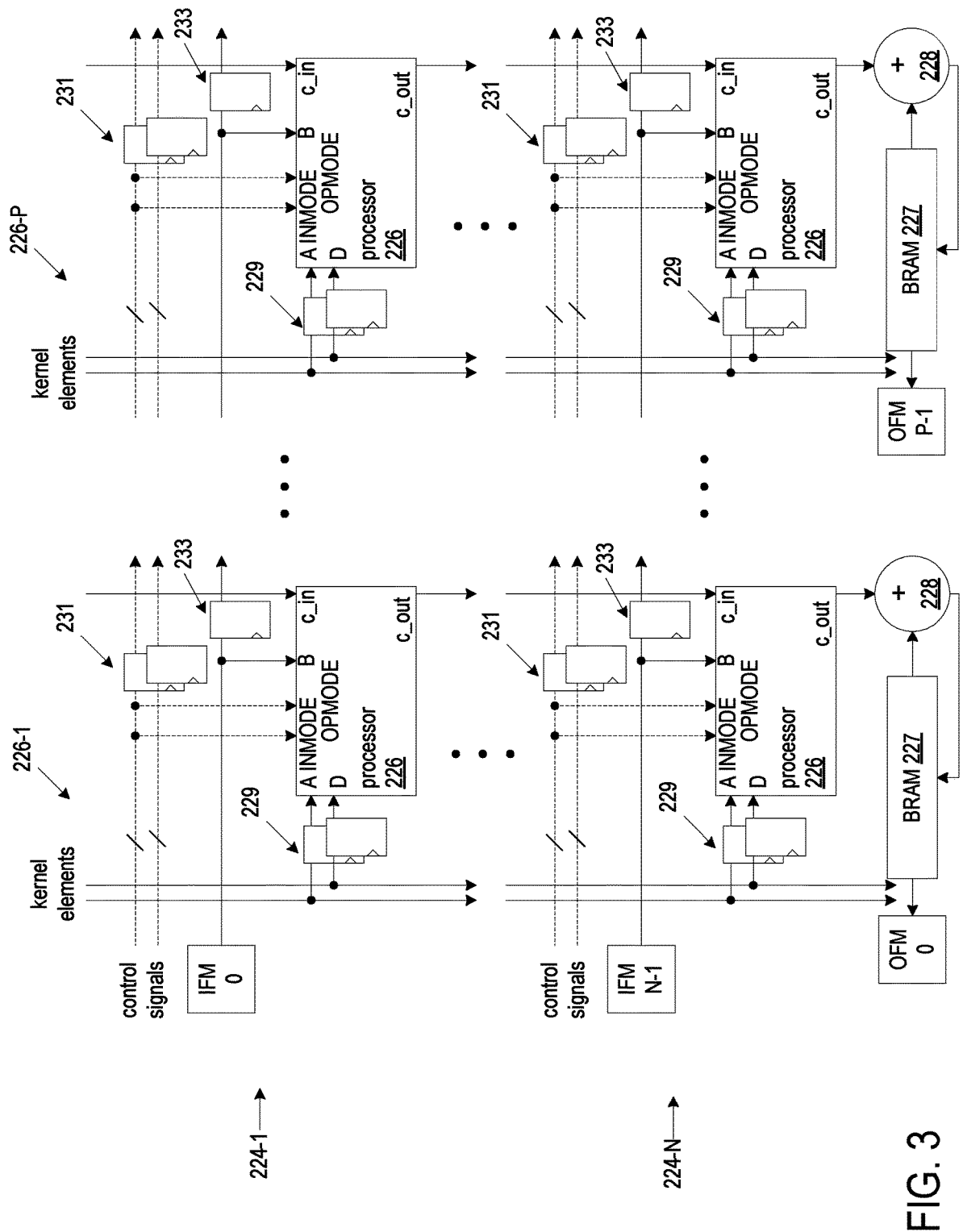
FIG. 3 shows a block diagram of an exemplary array of MAC circuits.

FIG. 3 shows a block diagram of an exemplary array of MAC circuits 112. Each MAC includes a processor circuit 226 (e.g., digital signal processor (DSP)), a register 233 for pipelining the data elements of an IFM sub-volume, a double-buffered register 229 for storing elements of a kernel, and a set of registers 231 for pipelining control signals across the rows of the array 112. The processor circuit 226 performs MAC operations including multiplying a data element of an IFM sub-volume, denoted as B in FIG. 3, with elements of a kernel, denoted as A and D in FIG. 3. As shown in FIG. 3, the MAC circuits are "stacked" on top of each other such that the Carry-In (c_in) and Carry-Out (c_out) channels of the processing circuits 226 are cascaded together. The result of the multiplication is summed with the Carry-In from a previous (above) processor circuit 226 of a column and passed to the next (below) processor circuit 226. The MAC operation can be described as c_out=(A or D)*B+c_in.

The cascading MAC circuits form the columns of the array 112. The columns of the array 112 are replicated to create the rows of the array 112. The double-buffered registers 229 (A/D) in each column can be coupled to a one-hot-encoding bus. Either a first element of a kernel (A) stored in a first buffer of the double-buffered register 229 or a second element of the kernel (D) stored in a second buffer of the double-buffered register 229 is input to each processor circuit 226 in a round-robin fashion. For example, if the second buffer is empty then the first element of the kernel (A) stored in the first buffer is input, and if the first buffer is empty then the second element of the kernel (D) stored in the second buffer is input. The control inputs INMODE and OPMODE control the MAC operation performed by the processor circuit 226 and the selection of the element of the kernel from the double-buffered register 229.

The accumulator circuit 117 shown in FIG. 1 can include a BRAM 227 configured for storage of intermediate summations and a time-multiplexed adder 228 for each column of the array 112. The BRAM 227 and the adder 228 merge the results of the MAC operations that are propagated through each column of the array 112. The maximum number of partial accumulations that can be performed is dependent on the size of the BRAM 227.

An exemplary dataflow of the array of MAC circuits 112 shown in FIG. 3 begins with an element of a kernel being input to each processor circuit 226. Data elements of an IFM sub-volume are input the array (according to the sequence of addresses generated by the pixel iterator circuit 111) and are traversed through the rows of the array 112. The results of the MAC operations are propagated vertically through columns of the array 112 and are accumulated at the bottom of the array 112 by the accumulator circuit 117. These steps are repeated for each 2-D plane of the IFM sub-volume. For example, as shown in FIG. 3, a first 2-D plane (IFM 0) of an IFM sub-volume is input to the MAC circuits of the first row 224-1 of the array 112 and a last 2-D plane (IFM N−1) of the IFM sub-volume is input to the MAC circuits of the last row 224-N of the array 112. Although FIG. 3 shows a one-to-one correspondence between the number of 2-D planes of an IFM sub-volume and the number of rows of the array, implementations are not so limited. A different 2-D plane of the IFM sub-volume can be input the rows of the array 112 until MAC operations are performed on all 2-D planes of the IFM sub-volume. The result of the final accumulation by the accumulator circuit 117 for each column of the array 112 generates a 2-D OFM of a 3-D OFM. For example, as shown in FIG. 3, the final accumulation for column 226-1 of the array 112 generates a first 2-D OFM (OFM 0) of a 3-D OFM and the final accumulation for column 226-P of the array 112 generates a last 2-D OFM (OFM P) of the 3-D OFM.

An advantageous aspect of the aforementioned dataflow is that the data elements of the IFM sub-volume are not reformatted for two consecutive sets of MAC operations performed by the array 112 because IFM sub-volumes are processed in the same format as the generated 3-D OFM. Thus, the disclosed approaches significantly reduce the area needed to implement a CNN because resources are not required to reformat the data elements. Therefore, the disclosed approaches can be used initiate multiple sets of MAC operations (e.g., convolution calls) back-to-back without any software intervention or area overhead. If the array of MAC circuits is not square (e.g., square being an equal number of rows and columns), then the data elements of the IFM sub-volume may need to be reformatted. However, as explained below in association with FIG. 5, two square instances of an array of MAC circuits can be used to form a rectangular array of MAC circuits.

Figure 4:
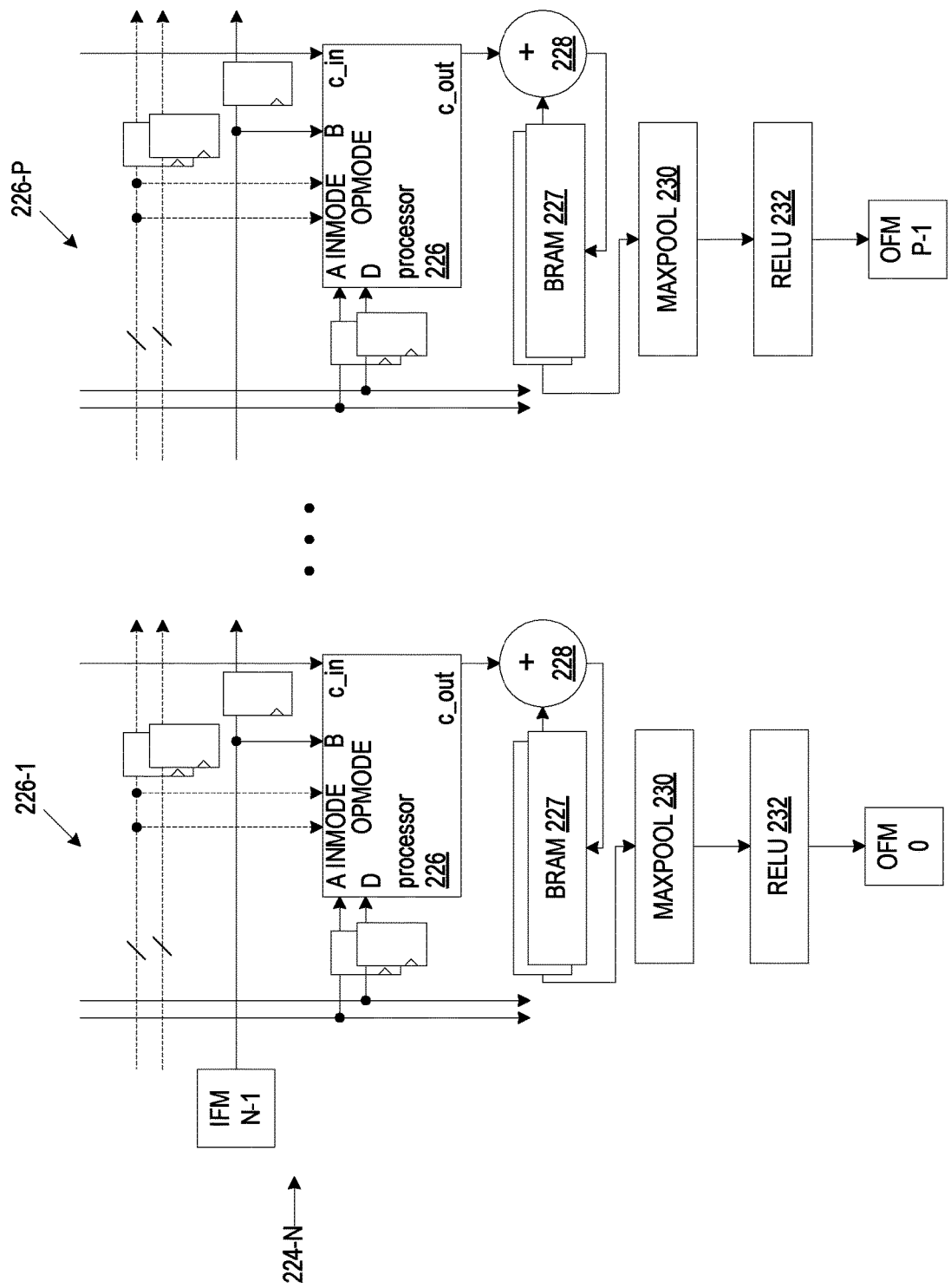
FIG. 4 shows exemplary post-processing blocks of the circuit arrangement of FIG. 1.

FIG. 4 shows exemplary post-processing blocks of the circuit arrangement of FIG. 1. As shown in FIG. 4, one or more post-processing blocks can be coupled to the BRAM 227 for each column of the array of MAC circuits 112 to further process the 2-D OFMs (e.g., OFM 0, OFM P−1) in a streaming fashion prior to writing the 2-D OFMs to the external memory 102. For example, a MAXPOOL block 230 and a rectified linear unit (ReLU) block 232 can be coupled to the BRAM 227. The ReLU block 232 can operate on the output of the MAXPOOL block 230; however, implementations are not so limited. As shown in FIG. 4, the accumulator circuit 117 can include a set of double-buffered BRAMs for each column of the array 112 to simultaneously perform MAC operations on an unprocessed IFM sub-volume while performing post-processing on the 2-D OFMs from a processed IFM sub-volume.

Figure 5:
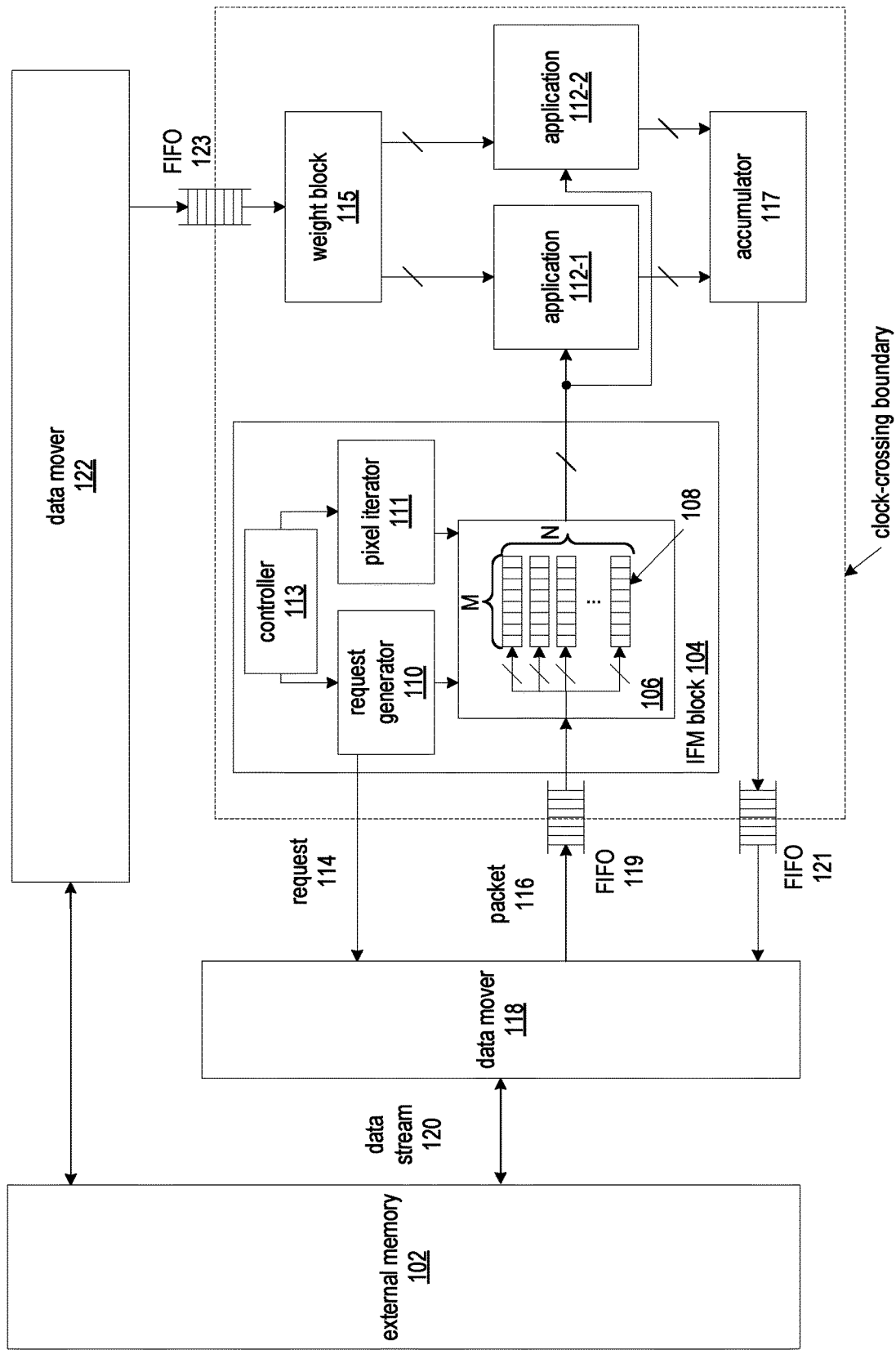
FIG. 5 shows an exemplary circuit arrangement including two instances of an array of MAC circuits.

FIG. 5 shows an exemplary circuit arrangement including two instances 112-1 and 112-2 of the array of MAC circuits 112. Placement of the processor circuits 226 shown in FIG. 3 is restricted only in the vertical dimension because of cascading of the Carry-In (c_in) and Carry-out (c_out) channels of the processor circuits 226. Thus, there is flexibility in placement of the processor circuits 226 in the horizontal dimension. Such flexibility enables the use of square arrays of MAC circuits, coupled to the weight block 115 and the accumulator circuit 117, as building blocks to create a rectangular array of MAC circuits. As explained above in association with FIG. 3, using multiple square arrays of MAC circuits avoids the need to reformat the data elements of an IFM sub-volume when performing sets of MAC operations back-to-back. For example, the arrays of MAC circuits 112-1 and 112-2 can each be square (e.g., 4×4) and placed side-by-side. The same 2-D plane of an IFM sub-volume can be input to each of the arrays 112-1 and 112-2, but MAC operations can be performed on the 2-D plane, by the arrays 112-1 and 112-2, using different elements of a same or different kernel. Therefore, two 4×4 arrays of MAC circuits effectively form a 4×8 array of MAC circuits. In another implementation, the arrays 112-1 and 112-2 can perform MAC operations using the same elements of a kernel but on different 2-D planes of an IFM sub-volume.

Figure 6:
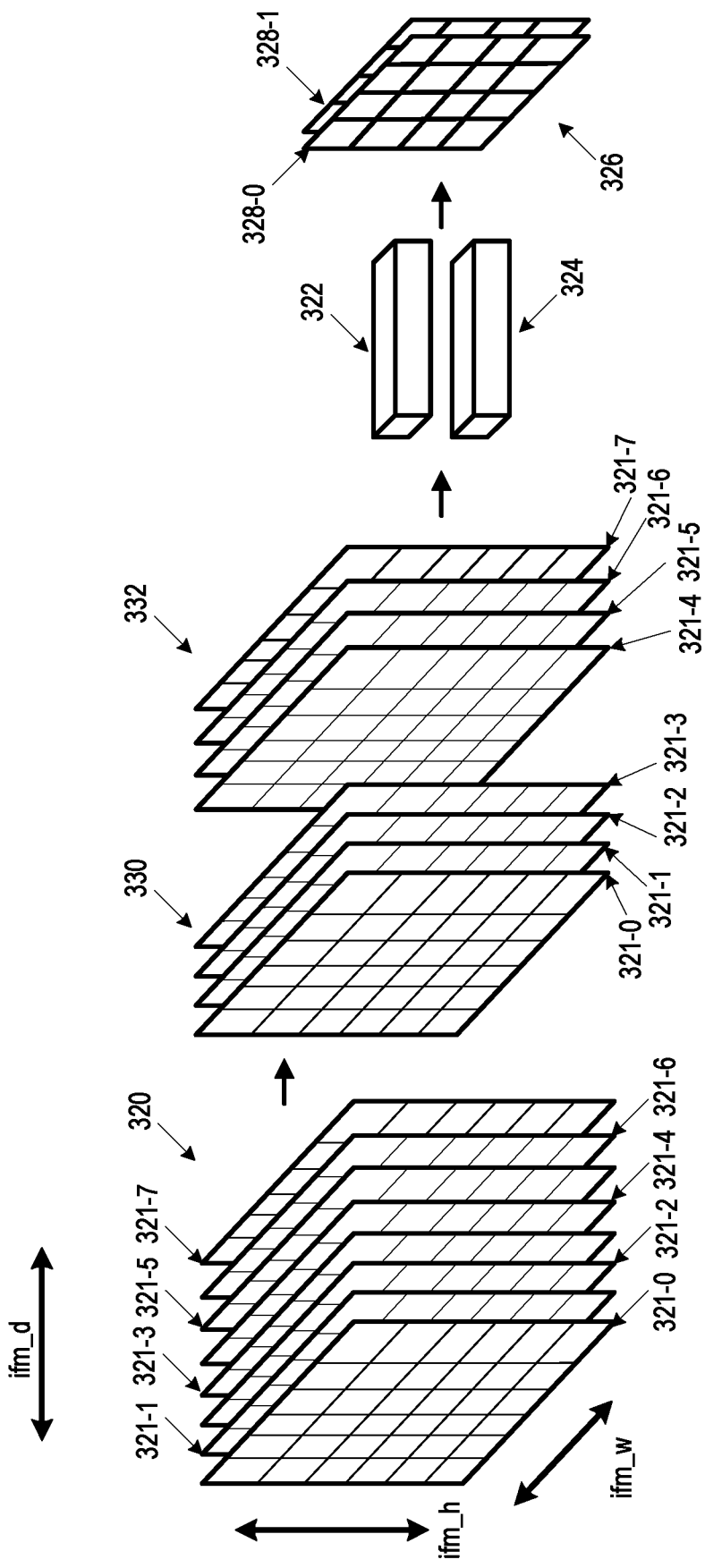
FIG. 6 shows an exemplary division of the depth of a 3-D IFM.

FIG. 6 shows an exemplary division of the depth of a 3-D IFM 320. The width (ifm_w) of the 3-D IFM 320 is 6, the height (ifm_h) of the 3-D IFM 320 is 6, and the depth (ifm_d) of the 3-D IFM 320 is 8. The width (k_w) of the kernels 322 and 324 is 3, the height (k_h) of the kernels 322 and 324 is 3, and the depth (k_d) of the kernels 322 and 324 is 8. In the example shown in FIG. 6, each of 4 line buffers 108 (N=4) is configured for storage of at least 36 data elements (M is greater or equal to 36). Each of the 2-D planes 321 include 36 data elements (6*6=36). Thus, the data elements of one of the 2-D planes 321 fit in one of the line buffers 108. However, the depth of the 3-D IFM 320 is larger than the number of line-buffers 108 (there are 4 more 2-D planes than there are line buffers (8>4)). As a result, the entire 3-D IFM 320 does not fit in the buffer circuit 106.

In response to the depth (ifm_d) of the 3-D IFM being greater than N, the 3-D IFM 320 is divided into equally sized IFM sub-volumes so that one 2-D plane of an IFM sub-volume fits in one of the N line buffers 108. In the example shown in FIG. 6, the height (h) of each IFM sub-volume is equal to the height (ifm_h) of the 3-D IFM 320, the width (w) of each IFM sub-volume is equal to the width (ifm_w) of the 3-D IFM 320, and the depth (d) of each IFM sub-volume is equal to N. Thus, as shown in FIG. 3, the IFM sub-volumes 330 and 332 each have a width (w) of 6, a height (h) of 6, and a depth (d) of 4. The IFM sub-volume 330 includes the 2-D planes 321-0, 321-1, 321-2, and 321-3, and the IFM sub-volume 332 includes the 2-D planes 321-4, 321-5, 321-6, and 321-7. The number of IFM sub-volumes (depth_fragment) is defined by the depth (ifm_d) of the 3-D IFM 320 divided by N. Thus, the number of sub-volumes is 2 (8/4).

MAC operations are performed on the data elements of the IFM sub-volumes 330 and 332, and the kernel 322 to generate the 2-D OFM plane 328-0 of the 3-D OFM 326. Similarly, MAC operations are performed on the data elements of the IFM sub-volumes 330 and 332 and the kernel 324 to generate the 2-D OFM plane 328-1 of the 3-D OFM 326.

Figure 7:
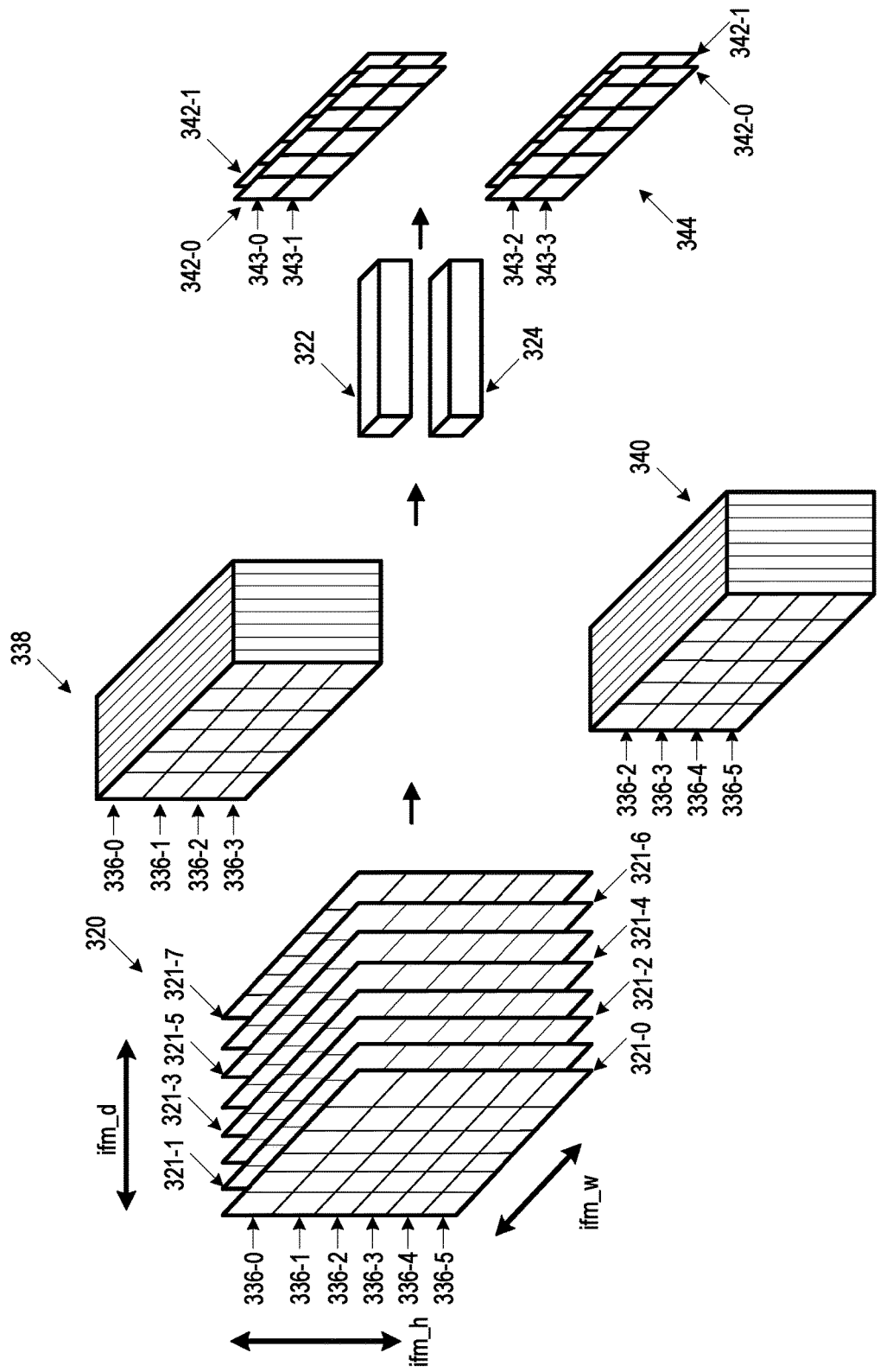
FIG. 7 shows an exemplary division of the height of a 3-D IFM.

FIG. 7 shows an exemplary division of the height of a 3-D IFM 320. The width (ifm_w) of the 3-D IFM 320 is 6, the height (ifm_h) of the 3-D IFM 320 is 6, and the depth (ifm_d) of the 3-D IFM 320 is 8. The width (k_w) of the kernels 322 and 324 is 3, the height (k_h) of the kernels 322 and 324 is 3, and the depth (k_d) of the kernels 322 and 324 is 8. In the example shown in FIG. 7, each of 8 line buffers 108 (N=8) is configured for storage of 24 data elements (M=24). Each of the 2-D planes 321-0 through 321-7 includes 36 data elements (6*6=36). Thus, there is a line buffer for each of the 8 2-D planes. However, all the data elements of a 2-D plane (e.g., 321-0) do not fit in one of the line buffers 108 (36>24). As a result, the entire 3-D IFM 320 does not fit in the buffer circuit 106.

In response to the number of data elements of the 2-D planes 321 being greater than M, the 3-D IFM 320 is divided into equally sized IFM sub-volumes so that one 2-D plane of an IFM sub-volume fits in one of the N line buffers 108. In the example shown in FIG. 7, the width (w) of each IFM sub-volume is equal to the width (ifm_w) of the 3-D IFM 320, and the depth (d) of each IFM sub-volume is equal to the depth (ifm_d) of the 3-D IFM 320. The height of the 3-D IFM 320 cannot be simply cut in half because each data element (e.g., pixel) of the 3-D OFM 344 has a dependency to a subset of neighboring data elements (e.g., pixels) of the 3-D IFM 320. This dependency is based on the height (k_h) and the width (k_w) of the kernels 322 and 324 that are applied over the 2-D planes 321. Due to this dependency, in order to determine the height (h) of the IFM sub-volumes, the maximum number of rows (imax) of a 2-D plane (e.g., 321-0) that fits in one of the line buffers 108 is determined.

The maximum number of IFM rows (imax) is the largest integer multiple of the width (ifm_w) of the 3-D IFM 220. Thus, the maximum number of IFM rows (imax) can be expressed as imax=floor(M/ifm_w). The maximum number of rows (omax) of the 3-D OFM 344 that can be generated if the maximum number of IFM rows (imax) were stored in the line buffers 108 is determined. The variable omax is a function of the maximum number of IFM rows (imax), the height (k_h) of the kernels 322 and 324, and the stride. The variable omax can be expressed as omax=(imax−k_h)/stride+1. To find the height (h) of the sub-volumes, first the maximum number of equally-sized horizontal slices (max-NumOFMRows) is determined, such that: 1) maxNumOF-MRows evenly partitions the OFM volume, and 2) the partition height is less than omax. The height (h) of the sub-volumes can then be determined as a function of omax, the height (k_h) of the kernels 322 and 324, and the stride and can be expressed as h=stride*(maxNumOFMRows−1)+k_h.

In the example of FIG. 4, the stride is 1 so that the maximum number of IFM rows (imax) is 4 (floor(24/6)) and the maximum number of OFM rows (omax) is 2 ((4−3)/1+1). Thus, the height (h) of the sub-volumes is 4 (1*(2−1)+3). As shown in FIG. 7, the IFM sub-volumes 338 and 340 each have a width of 6, a height of 4, and a depth of 8. The IFM sub-volume 338 includes the rows 336-0, 336-1, 336-2, and 336-3 of the 2-D planes 321, and the IFM sub-volume 340 includes the rows 336-2, 336-3, 336-4, and 336-5 of the 2-D planes 321. The number of IFM sub-volumes (height_fragment) is defined as the height (ofm_h) of the 3-D OFM 344 divided by the maximum number of OFM rows (omax). The number of IFM sub-volumes (height_fragment) can be expressed as ceil(ofm_h/omax). Here, the number of sub-volumes is 2 (ceil(4/2)).

MAC operations are performed on the data elements of the IFM sub-volume 338 and the kernel 322 to generate the rows 343-0 and 343-1 of the 2-D OFM plane 342-0 of the 3-D OFM 344 and MAC operations are performed on the data elements of the IFM sub-volume 340 and the kernel 322 to generate the rows 343-2 and 343-3 of the 2-D OFM plane 342-0 of the 3-D OFM 344. Similarly, MAC operations are performed on the data elements of the IFM sub-volume 338 and the kernel 324 to generate the rows 343-0 and 343-1 the 2-D OFM plane 342-1 of the 3-D OFM 344 and MAC operations are performed on the data elements of the IFM sub-volume 340 and the kernel 324 to generate the rows 343-2 and 343-3 of the 2-D OFM plane 342-1 of the 3-D OFM 344.

Figure 8A:
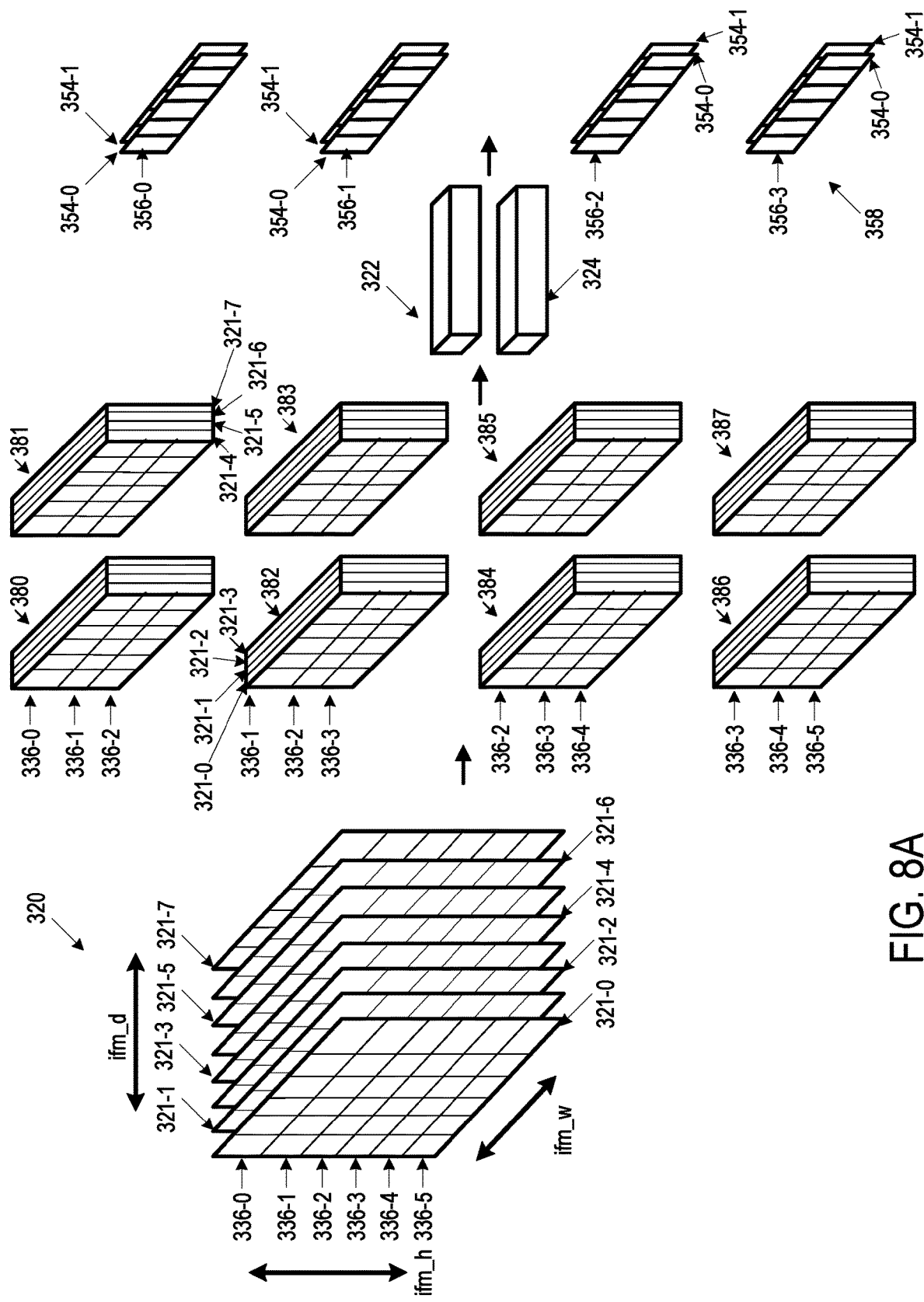
FIG. 8A shows an exemplary division the depth and height of a 3-D IFM.

FIG. 8A shows an exemplary division the depth and height of a 3-D IFM 320. The width (ifm_w) of the 3-D IFM 320 is 6, the height (ifm_h) of the 3-D IFM 320 is 6, and the depth (ifm_d) of the 3-D IFM 320 is 8. The width (k_w) of the kernels 322 and 324 is 3, the height (k_h) of the kernels 322 and 324 is 3, and the depth (k_d) of the kernels 322 and 324 is 8. In the example shown in FIG. 8A, each of 4 line buffers 108 (N=4) is configured for storage of 18 data elements (M=18). Each of the 2-D planes 321 include 36 data elements (6*6=36). Thus, the depth of the 3-D IFM 320 is larger than the number of line-buffers 108 (there are 4 more 2-D planes than there are line buffers (8>4)), and all the data elements of a 2-D plane (e.g., 321-0) do not fit in one of the line buffers 108 (36>18). As a result, the entire 3-D IFM 320 does not fit in the buffer circuit 106.

In response to the number of data elements of the 2-D planes 321 being greater than M, the 3-D IFM 320 is divided into equally sized IFM sub-volumes so that one 2-D plane of individual IFM sub-volumes fit in one of the N line buffers 108. In the example shown in FIG. 8A, the width (w) of each IFM sub-volume is equal to the width (ifm_w) of the 3-D IFM 320. The height of the 3-D IFM 320 cannot be simply cut in half because each data element (e.g., pixel) of the 3-D OFM 344 has a dependency to a subset of neighboring data elements (e.g., pixels) of the 3-D IFM 320. This dependency is based on the height (k_h) and the width (k_w) of the kernels 322 and 324 that are applied over the 2-D planes 321. Due to this dependency, in order to determine the height (h) of the IFM sub-volumes, the maximum number of rows (imax) of a 2-D plane (e.g., 321-0) that fits in one of the line buffers 108 is determined as explained above in association with FIGS. 4 and 5A.

In the example of FIG. 8A, the stride is 1 so that the maximum number of IFM rows (imax) is 3 (floor(18/6)) and the maximum number of OFM rows (omax) is 1 ((3−3)/1+

1). Thus, the height (h) of the sub-volumes is 3 (1*(1−1)+3). Because the depth (ifm_d) of the 3-D IFM 320 is greater than N, each IFM sub-volume is designated to include N of the 2-D planes 321 as explained above in association with FIG. 3. In the example shown in FIG. 8A, each of the IFM sub-volumes include a subset of the data elements of 4 of the 8 IFM planes 321. As shown in FIG. 8A, the height, width, and depth of each of the IFM sub-volumes 380, 381, 382, 383, 384, 385, 386, and 387 is 3, 6, and 4, respectively. The number of IFM height fragments (height_fragment) is 4 (ceil(4/1)). The number of depth fragments (depth_fragment) is 2. As a result, the total number of IFM sub-volumes is 8 (4*2).

Figure 8B:
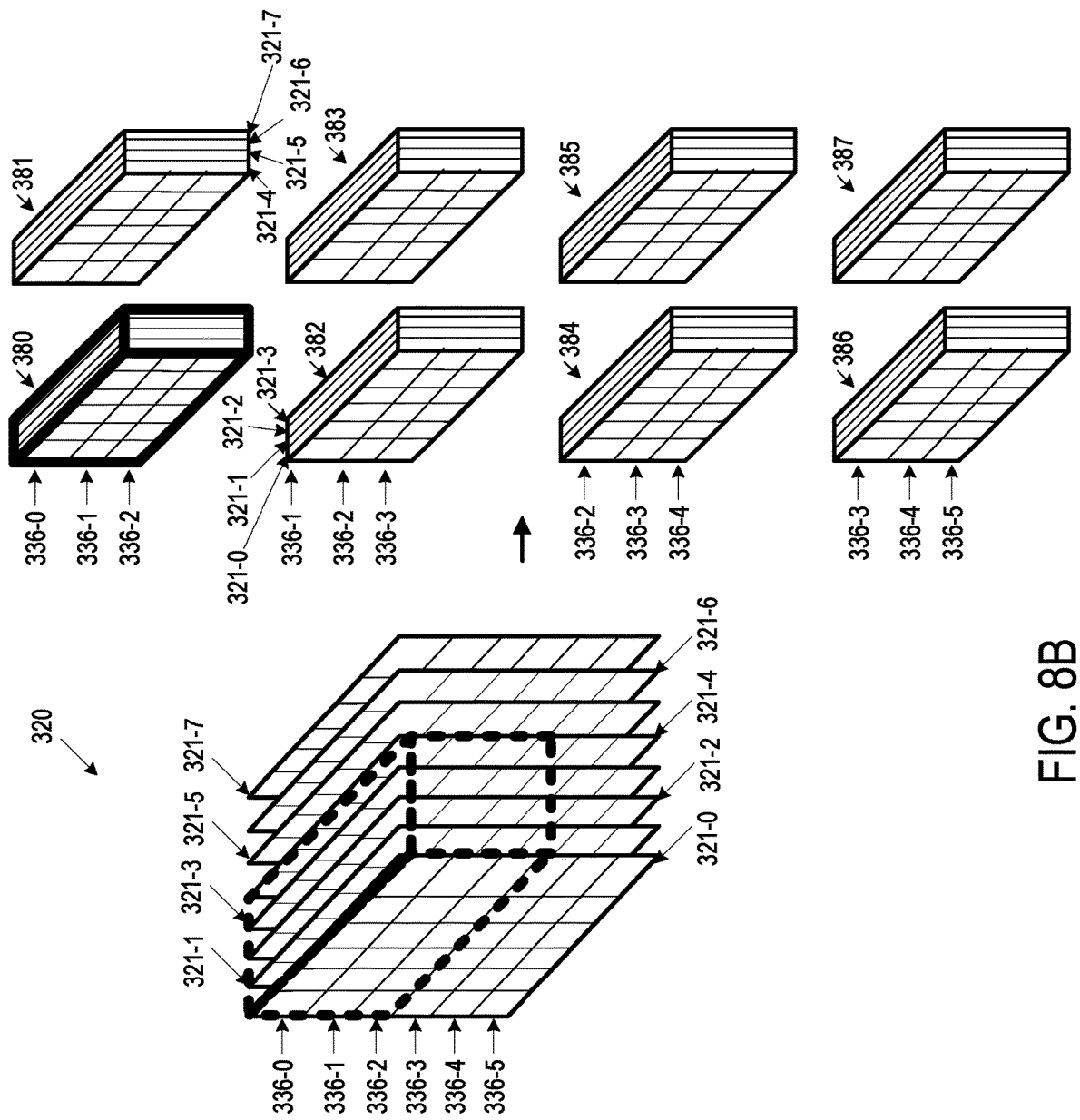
FIGS. 8B-8I show the correspondence between the 3-D IFM and the IFM sub-volumes of FIG. 8A.

FIGS. 8B-8I show the correspondence between the 3-D IFM 320 and the IFM sub-volumes 380, 381, 382, 383, 384, 385, 386, and 387. As shown in FIG. 8B, the IFM sub-volume 380 includes the rows 336-0, 336-1, and 336-2 of the 2-D planes 321-0, 321-1, 321-2, and 321-3. MAC operations are performed on the data elements of the IFM sub-volume 380 and the kernel 322 to generate the row 356-0 of the 2-D OFM plane 354-0 of the 3-D OFM 358 shown in FIG. 8A. Similarly, MAC operations are performed on the data elements of the IFM sub-volume 380 and the kernel 324 to generate the row 356-0 of the 2-D OFM plane 354-1 of the 3-D OFM 358 shown in FIG. 8A.

Figure 8C:
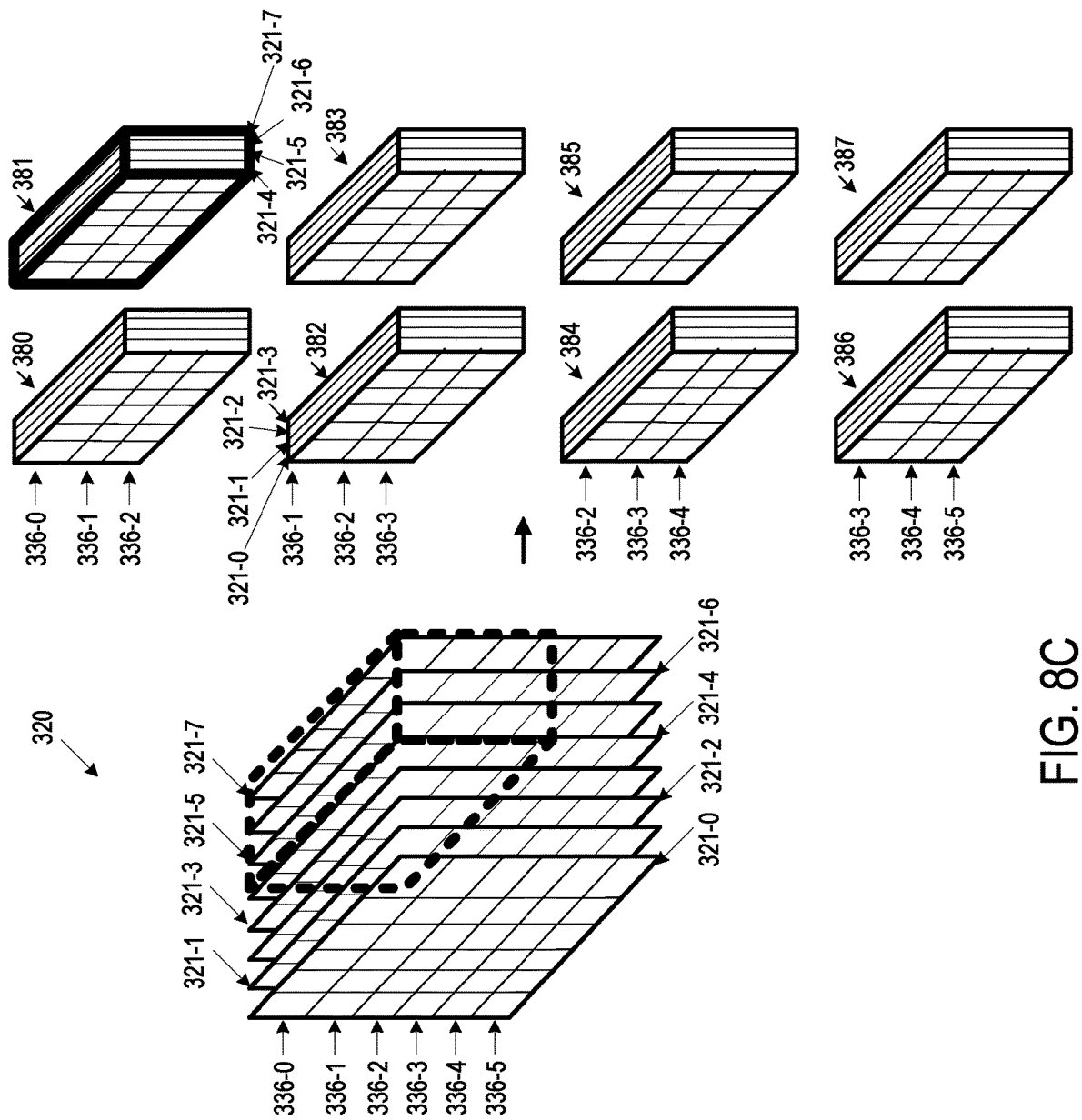

As shown in FIG. 8C, the IFM sub-volume 381 includes the rows 336-0, 336-1, and 336-2 of the 2-D planes 321-4, 321-5, 321-6, and 321-7. MAC operations are performed on the data elements of the IFM sub-volume 381 and the kernel 322 to generate the row 356-0 of the 2-D OFM plane 354-0 of the 3-D OFM 358 shown in FIG. 8A. Similarly, MAC operations are performed on the data elements of the IFM sub-volume 381 and the kernel 324 to generate the row 356-0 of the 2-D OFM plane 354-1 of the 3-D OFM 358 shown in FIG. 8A.

Figure 8D:
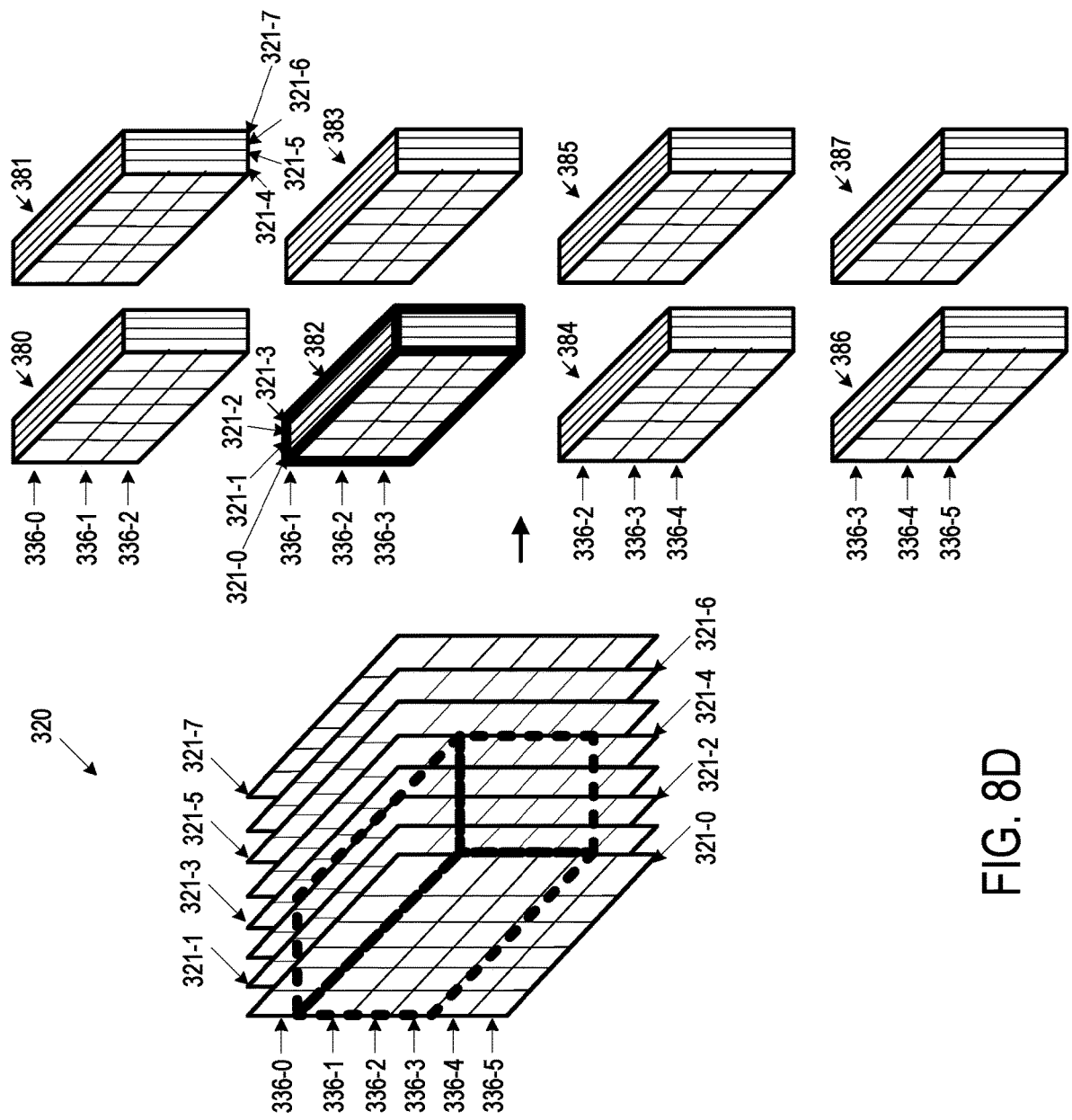

As shown in FIG. 8D, the IFM sub-volume 382 includes the rows 336-1, 336-2, and 336-3 of the 2-D planes 321-0, 321-1, 321-2, and 321-3. MAC operations are performed on the data elements of the IFM sub-volume 382 and the kernel 322 to generate the row 356-1 of the 2-D OFM plane 354-0 of the 3-D OFM 358 shown in FIG. 8A. Similarly, MAC operations are performed on the data elements of the IFM sub-volume 382 and the kernel 324 to generate the row 356-1 of the 2-D OFM plane 354-1 of the 3-D OFM 358 shown in FIG. 8A.

Figure 8E:
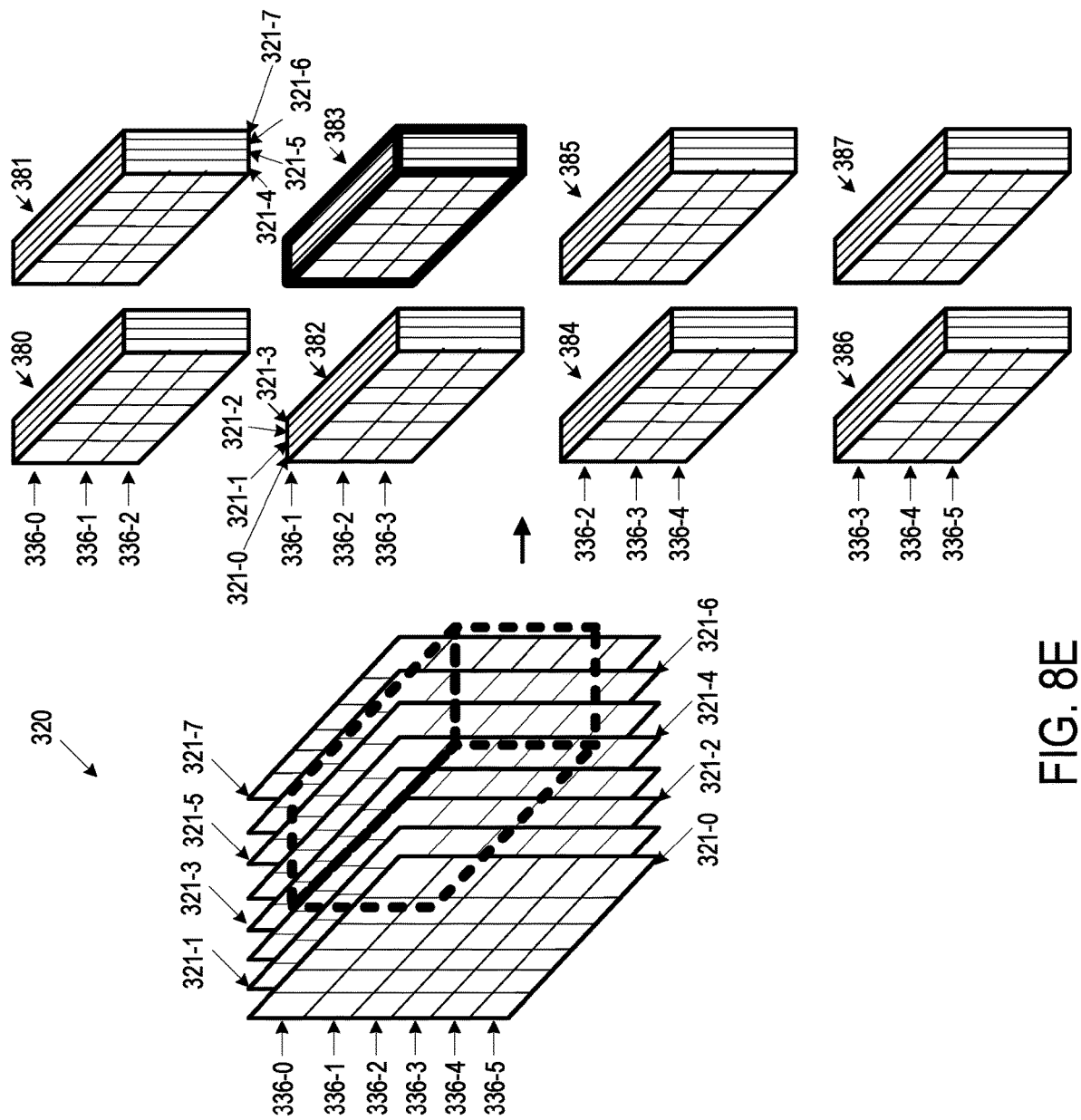

As shown in FIG. 8E, the IFM sub-volume 383 includes the rows 336-1, 336-2, and 336-3 of the 2-D planes 321-4, 321-5, 321-6, and 321-7. MAC operations are performed on the data elements of the IFM sub-volume 383 and the kernel 322 to generate the row 356-1 of the 2-D OFM plane 354-0 of the 3-D OFM 358 shown in FIG. 8A. Similarly, MAC operations are performed on the data elements of the IFM sub-volume 383 and the kernel 324 to generate the row 356-1 of the 2-D OFM plane 354-1 of the 3-D OFM 358 shown in FIG. 8A.

Figure 8F:
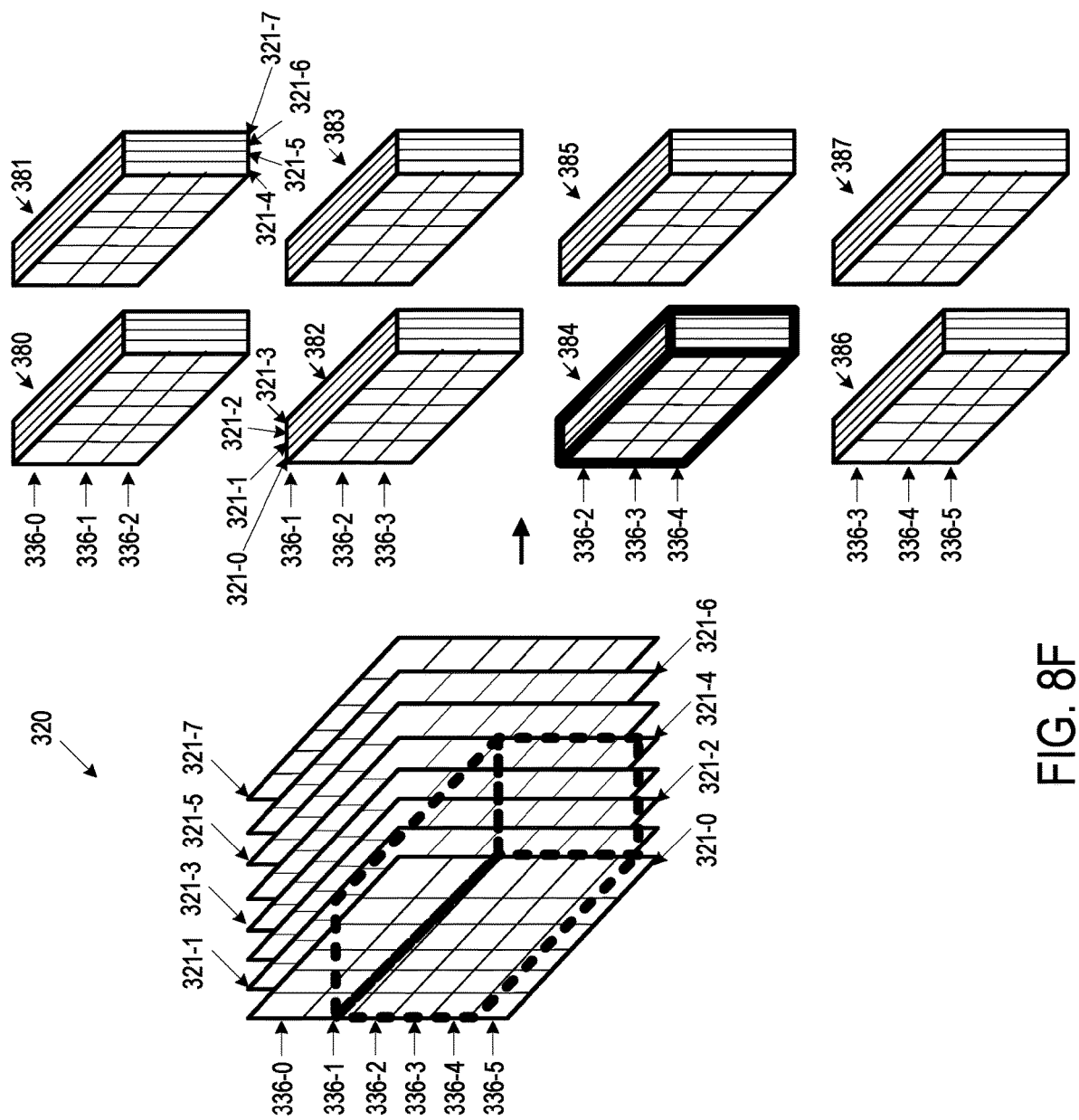

As shown in FIG. 8F, the IFM sub-volume 384 includes the rows 336-2, 336-3, and 336-4 of the 2-D planes 321-0, 321-1, 321-2, and 321-3. MAC operations are performed on the data elements of the IFM sub-volume 384 and the kernel 322 to generate the row 356-2 of the 2-D OFM plane 354-0 of the 3-D OFM 358 shown in FIG. 8A. Similarly, MAC operations are performed on the data elements of the IFM sub-volume 384 and the kernel 324 to generate the row 356-2 of the 2-D OFM plane 354-1 of the 3-D OFM 358 shown in FIG. 8A.

Figure 8G:
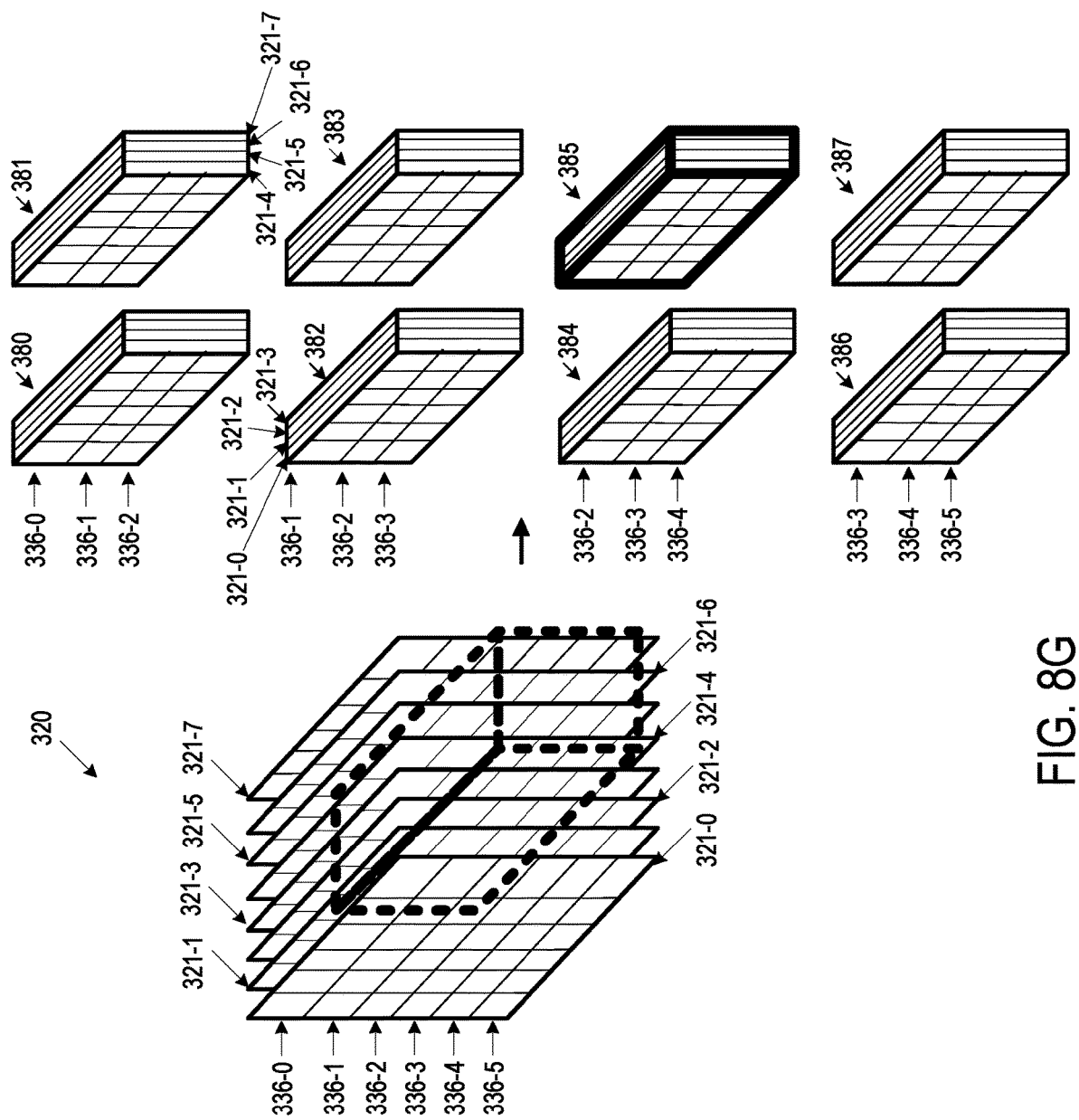

As shown in FIG. 8G, the IFM sub-volume 385 includes the rows 336-2, 336-3, and 336-4 of the 2-D planes 321-4, 321-5, 321-6, and 321-7. MAC operations are performed on the data elements of the IFM sub-volume 385 and the kernel 322 to generate the row 356-2 of the 2-D OFM plane 354-0 of the 3-D OFM 358 shown in FIG. 8A. Similarly, MAC operations are performed on the data elements of the IFM sub-volume 385 and the kernel 324 to generate the row 356-2 of the 2-D OFM plane 354-1 of the 3-D OFM 358 shown in FIG. 8A.

Figure 8H:
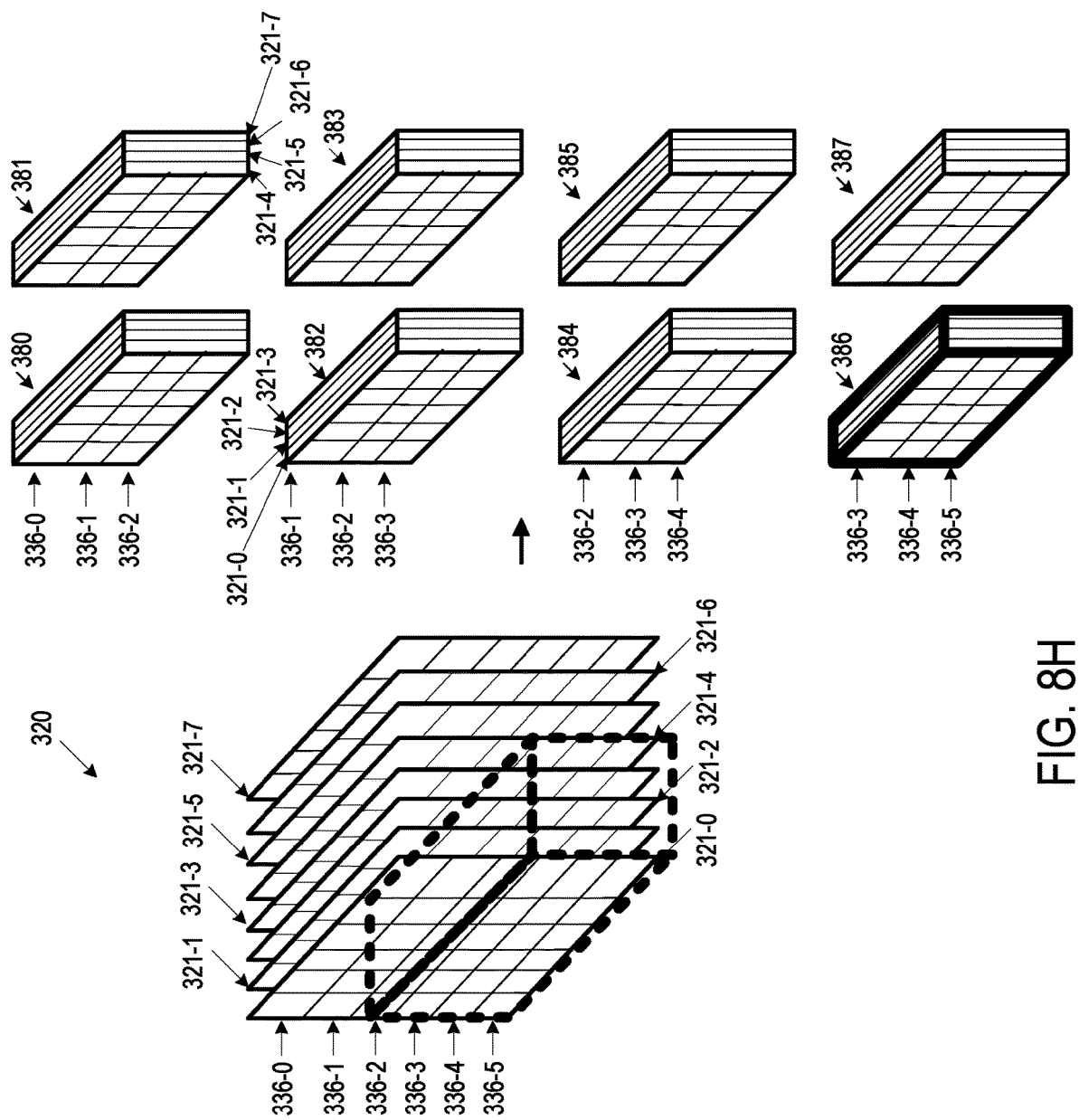

As shown in FIG. 8H, the IFM sub-volume 386 includes the rows 336-3, 336-4, and 336-5 of the 2-D planes 321-0, 321-1, 321-2, and 321-3. MAC operations are performed on the data elements of the IFM sub-volume 386 and the kernel 322 to generate the row 356-3 of the 2-D OFM plane 354-0 of the 3-D OFM 358 shown in FIG. 8A. Similarly, MAC operations are performed on the data elements of the IFM sub-volume 386 and the kernel 324 to generate the row 356-3 of the 2-D OFM plane 354-1 of the 3-D OFM 358 shown in FIG. 8A.

Figure 8I:
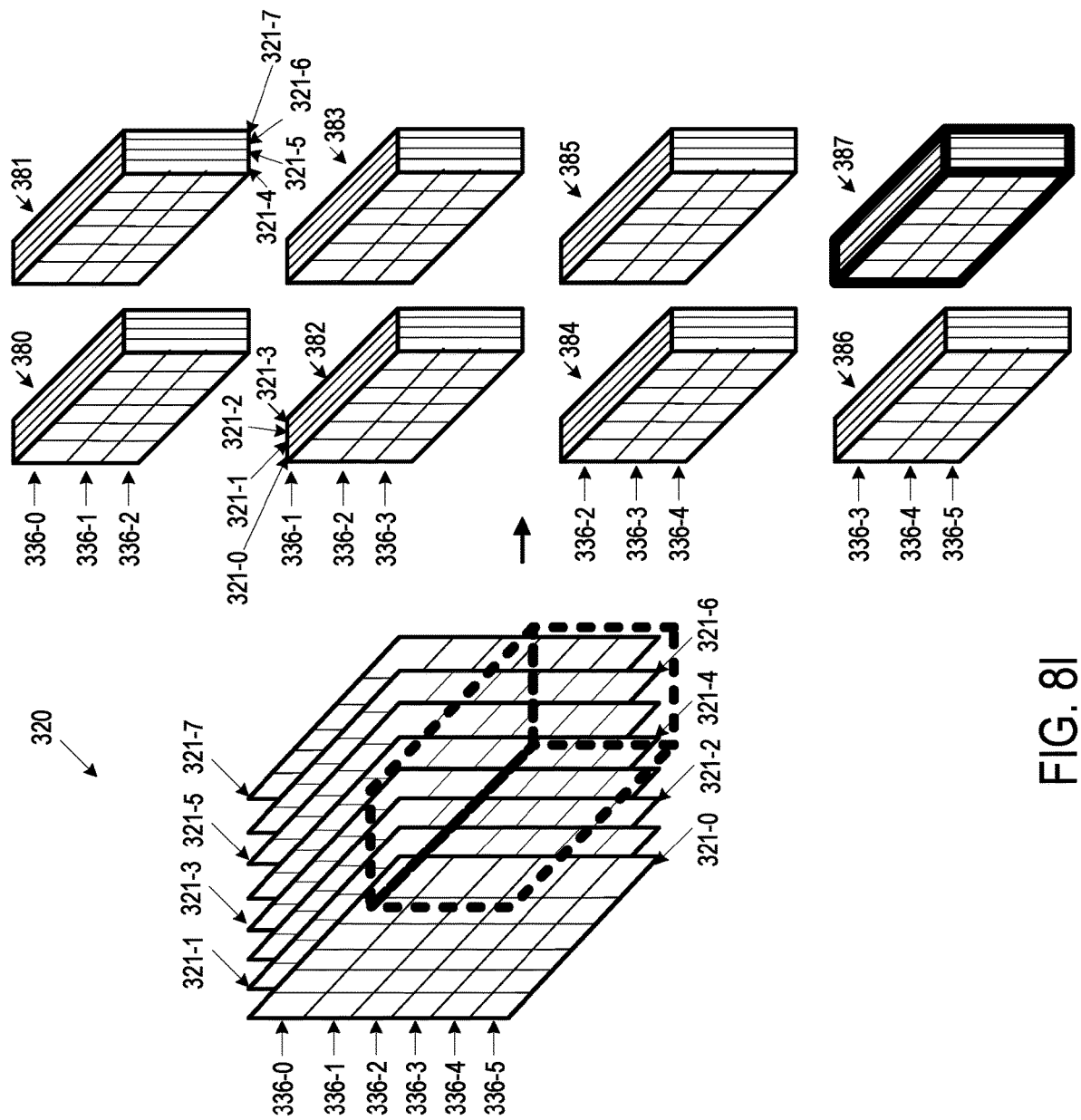

As shown in FIG. 8I, the IFM sub-volume 387 includes the rows 336-3, 336-4, and 336-5 of the 2-D planes 321-4, 321-5, 321-6, and 321-7. MAC operations are performed on the data elements of the IFM sub-volume 387 and the kernel 322 to generate the row 356-3 of the 2-D OFM plane 354-0 of the 3-D OFM 358 shown in FIG. 8A. Similarly, MAC operations are performed on the data elements of the IFM sub-volume 387 and the kernel 324 to generate the row 356-3 of the 2-D OFM plane 354-1 of the 3-D OFM 358 shown in FIG. 8A.

Although not specifically illustrated, the disclosed approaches can include dividing the height and width of a 3-D IFM. In response to the number of data elements of the 2-D IFM planes of a 3-D IFM being greater than M and the product of the width (ifm_w) of the 3-D IFM 220 and the height (k_h) of the kernels being greater than M, a 3-D IFM can be divided into equally sized IFM sub-volumes so that one 2-D plane of an IFM sub-volumes fits in one of the N line buffers 108 by dividing the height and width of the 3-D IFM.

The following pseudocode describes an exemplary algorithm for dividing a 3-D IFM (e.g., 320) into a plurality of IFM sub-volumes as explained above in association with FIGS. 6-8I. The algorithm generates a set of parameters that are provided to the request generator circuit 110 from which the request generator circuit 110 generates an ordered set of addresses for reading data elements of an IFM sub-volume from the external memory. The parameters include a length of the packet of data 116 (packet_length) that defines (e.g., by a quantity or range of addresses) an amount of data to be read from the external memory 102 for each request 114 (each IFM sub-volume). The parameters include address offsets depth_offset 406 and height_offset. The value of the address offset depth_offset 406 is dependent on N, the number of line buffers 108. If the height (ifm_h) of a 3-D IFM (e.g., 320) is to be divided, then the value of the address offset height_offset is non-zero. The parameters include a number of depth fragments (depth_fragment) and a number of height fragments (height_fragment). If the depth (ifm_d) of a 3-D IFM (e.g., 320) is to be divided then the value of depth_fragment will be greater than one. Similarly, if the height (ifm_h) of a 3-D IFM is to be divided then the value of height_fragment will be greater than one. The number of depth fragments (depth_fragment) and the number of height fragments (height_fragment) are discussed further in association with FIG. 10 below.

```
Func Partition (ifm_h, ifm_w, ifm_d, k_h, k_w, ofm_h, ofm_w, ofm_d, M,
N)
{
  If (ifm-h*ifm_w <= m & ifm-d <= n ) { // 3-D IFM fits in MxN storage
    h = ifm_h
    w = ifm_w
    d = ifm_d
    packet_length = h*w*depth_fragment
    depth_offset = ifm_h*ifm_w*N
    height_offset = 0
    height_fragment = 1
    depth_fragment = ifm_d/N
  }
  Else { // 3-D IFM does not fit in MxN storage
    Divisors( ) = divisors(ofm_h) // Find divisors of ofm_h
    imax = floor(m/ ifm_w) // find max number of IFM rows
    omax = (imax - k_h) / stride + 1 // find max number of OFM rows
    // Divisors( ) array is arranged from largest to smallest divisor
    maxNumOFMRows = 0
    For (i in divisors( )){
      If (divisors(i) <= omax) {
        maxNumOFMRows = divisors(i)
      }
    }
    // if no whole divisors, find a number that divides the height of the
    // 3-D IFM to fit in the line buffers
    If (maxNumOFMRows == 0){
      For ( i in 2 -> omax) {
        Temp = ceil(ofm_h/i)
        If (temp <= omax)
          maxNumOFMRows = temp
          break;
      }
    }
    // if the criteria is still not met then perform width fragment
    If (maxNumOFMRows == 0){
      //Perform width fragment by finding the divisors of ofm_2
      //similar to the algorithm for ofm_h specified above
    }
    // calculate the output parameters
    h = stride*(maxNumOFMRows -1)) + k_h
    w = ifm_w
    d = N
    depth_fragment = ifm_d / N
    height-fragment = ceil(ofm-h / maxNumOFMRows)
    packet_length = w * h
    height_offset = maxNumOFMRows * ifm_w * stride * N
    depth_offset = ifm_h * ifm_w * N
  }
  return (packet_length, depth_offset, height_offset, height_fragment,
depth_fragment)
}
```

Figure 9:
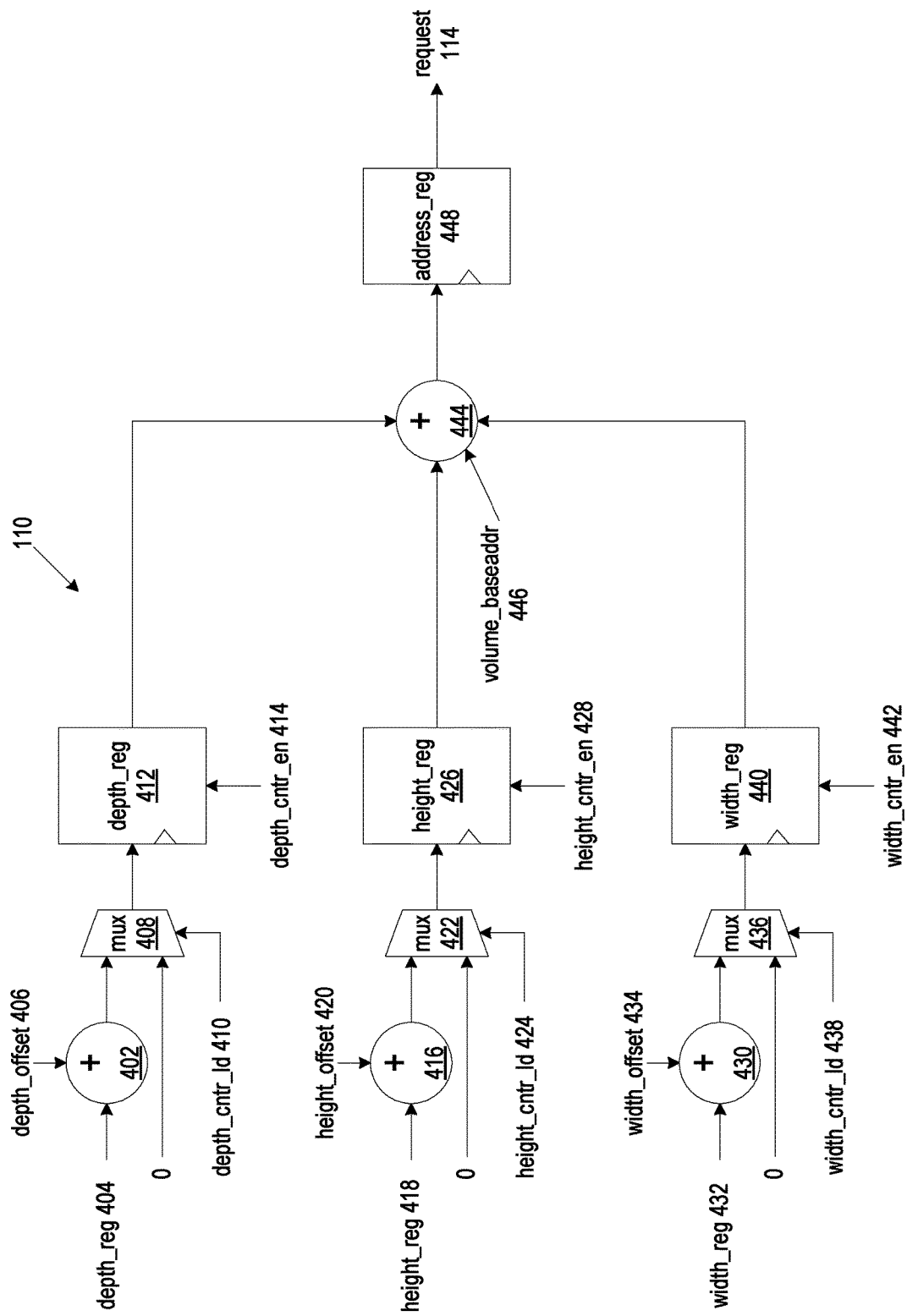
FIG. 9 shows a block diagram of exemplary circuitry of the request generator circuit of FIG. 1.

FIG. 9 shows a block diagram of exemplary circuitry of the request generator circuit 110 of FIG. 1. The request generator circuit 110 includes an adder 402 that receives the address offset depth_offset 406 and a value 404 from the depth_reg register 412. Reading a value from the depth_reg register 412 is enabled by control signal depth_cntr_en 414. The output of the adder 402 is input to a multiplexer 408, which is coupled to an input of the depth_reg register 412. A constant value "0" is also input to the multiplexer 408. Selection of the value written to the depth_reg register 412 is controlled by the load control signal depth_cntr_Id 410 to the multiplexer 408. Initially, the control signal depth_cntr_Id 410 selects the input of the multiplexer 408 having the constant value "0". Subsequently, the control signal depth_cntr_Id 410 selects an input of the multiplexer 408 that is the value 404 read from the depth_reg register 412 offset by the address offset depth_offset 406 via the adder 402. The offset value is written to the depth_reg register 412.

The request generator circuit 110 includes an adder 416 that receives the address offset height_offset 420 and a value 418 from the height_reg register 426. Reading a value from the height_reg register 426 is enabled by control signal height_cntr_en 428. The output of the adder 416 is input to a multiplexer 422, which is coupled to an input of the height_reg register 426. A constant value "0" is also input to the multiplexer 422. Selection of the value written to the height_reg register 426 is controlled by the load control signal height_cntr_Id 424 to the multiplexer 422. Initially, the control signal height_cntr_Id 424 selects the input of the multiplexer 422 having the constant value "0". Subsequently, the control signal height_cntr_Id 424 selects an input of the multiplexer 422 that is the value 418 read from the height_reg register 426 offset by the address offset height_offset 420 via the adder 416. The offset value is written to the height_reg register 426.

The request generator circuit 110 includes an adder 430 that receives an address offset width_offset parameter 434 and a value 432 from the width_reg register 440. Reading a value from the width_reg register 440 is enabled by control signal width_cntr_en 442. The output of the adder 430 is input to a multiplexer 436, which is coupled to an input of the width_reg register 440. A constant value "0" is also input to the multiplexer 436. Selection of the value written to the width_reg register 440 is controlled by the load control signal width_cntr_Id 438 to the multiplexer 436. Initially, the control signal width_cntr_Id 438 selects the input of the multiplexer 436 having the constant value "0". Subsequently, the control signal width_cntr_Id 438 selects an input of the multiplexer 436 that is the value 432 read from the width_reg register 440 offset by the address offset width_offset 434 via the adder 430. The offset value is written to the width_reg register 440.

The request generator circuit 110 includes an adder 444 that receives a value from each of the depth_reg register 412, the height_reg register 426, and the width_reg register 440, and a base address volume_baseaddr 446 and stores the sum in address_reg 448. The base address volume_baseaddr 446 is an address of a respective first data element of a 3-D IFM (e.g., 320). The values (e.g., address offsets) from the depth_reg register 412, the height_reg register 426, and the width_reg register 440 offset the base address volume_baseaddr 446 to the address of a respective first element of one of the IFM sub-volumes (e.g., 330, 346).

Figure 10:
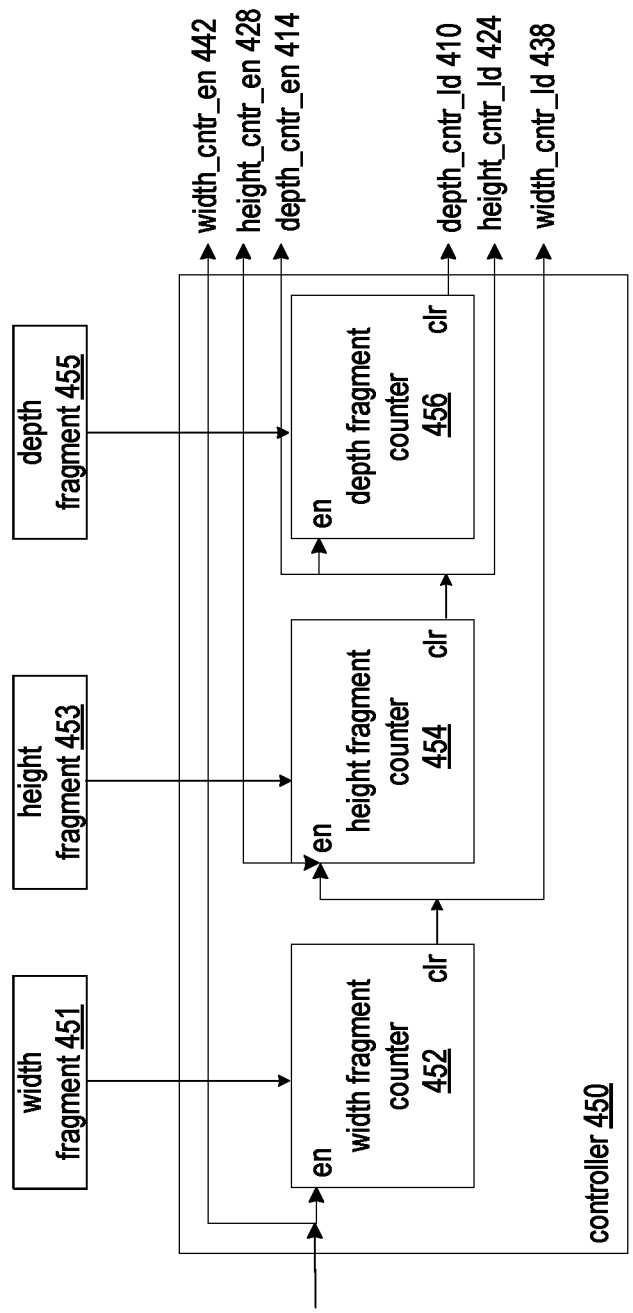
FIG. 10 shows a block diagram of an exemplary controller configured to generate control signals input to the request generator circuit of FIG. 9.

FIG. 10 shows a block diagram of an exemplary controller 450 configured to generate control signals input to the request generator circuit 110 of FIG. 9. The controller 450 can be analogous to or a component of the control circuit 113 shown in FIG. 1. The controller 450 includes counters for dividing a 3-D IFM into a plurality of IFM sub-volumes. The value of each counter of the controller 450 begins at zero and resets when the value reaches an upper bound. The depth fragment counter 456 counts from zero to the number of depth fragments (depth_fragment) 455, the height fragment counter 454 counts from zero to the number of height fragments (height_fragment) 453, and the width fragment counter 452 counts from zero to the number of width fragments (width_fragment) 451. The outputs of the counters are the control signals provided to the request generator circuit 110. The width fragment counter 452 outputs the enable control signal width_cntr_en 442 and the load control signal width_cntr_Id 438; the height fragment counter 454 outputs the enable control signal height_cntr_en 428 and the load control signal height_cntr_Id 424; and the depth fragment counter 456 outputs the enable control signal depth_cntr_en 414 and the load control signal depth_cntr_Id 410. The counters 452, 454, and 456 are coupled to one another in a chain so that when one counter resets, as indicated by a clear output signal at the "clr" pin, the next counter increments by one. The clear output of the width fragment counter 452 is coupled to an enable input of height fragment counter 454, and the clear output of the height fragment counter 454 is coupled to an enable input of the depth fragment counter 456.

Figure 11:
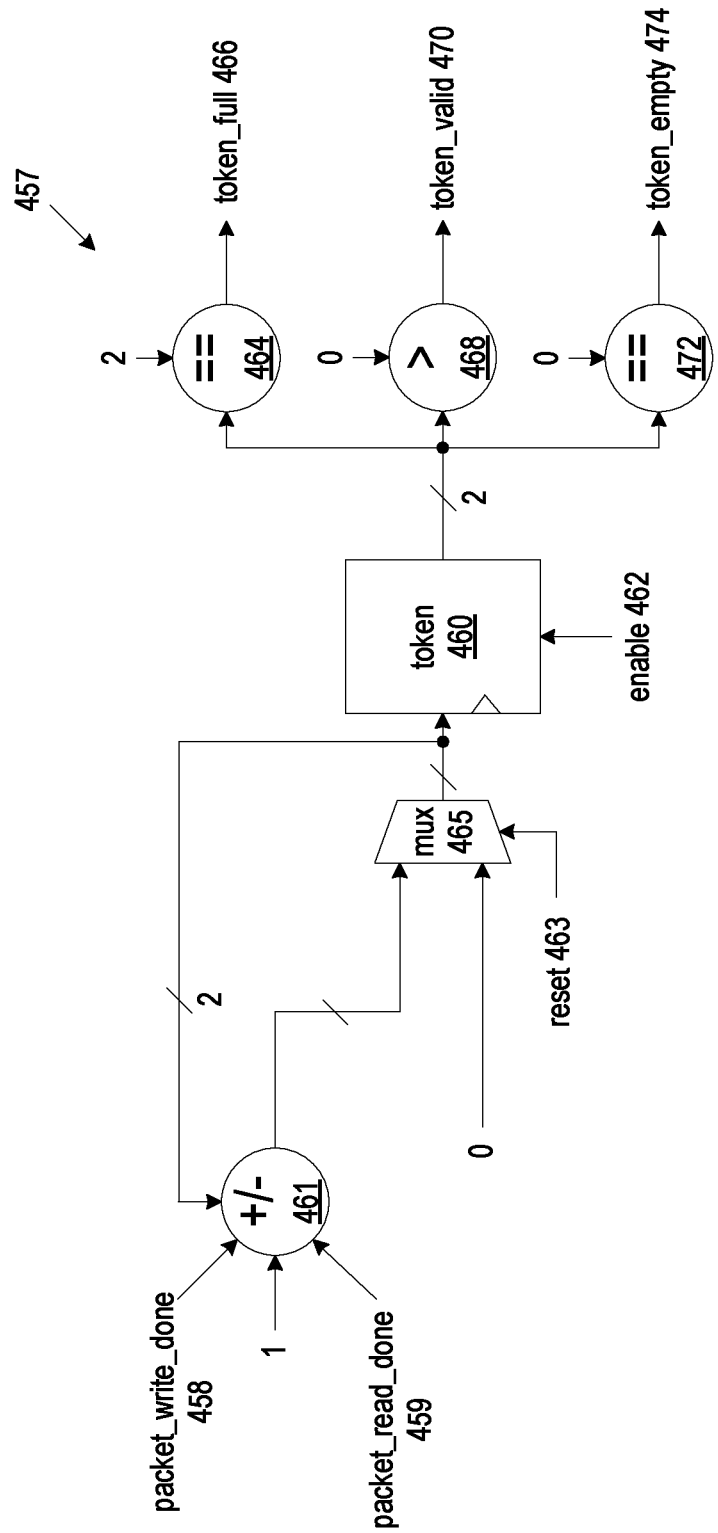
FIG. 11 shows a block diagram of an exemplary token-based control logic of the IFM block of FIG. 1.

FIG. 11 shows a block diagram of an exemplary token-based control logic 457 of the IFM block 104 of FIG. 1. In response to a packet of data (e.g., 116) being loaded into the line buffers 108, the buffer circuit 106 provides the packet_write_done signal 458 to the control logic 457 to increase the number of available tokens. In response to completing processing of a packet of data (e.g., performing MAC operations), the application 112 provides the packet_read_done signal 459 to the control logic 457 to reduce the number of available tokens. The control logic 457 outputs status indication signals based on the number of available tokens. The token_empty signal 474 indicates that the line buffers 108 are empty and not currently storing a packet of data for processing. The token_empty signal 474 is input to the application 112 to pause the processing until the next packet of data is ready for processing. The token_valid signal 470 indicates that there is at least one packet of data ready for processing in the line buffers 108. The token_valid signal 470 is input to the application 112 to initiate processing of a packet of data. The token_full signal 466 indicates that, in implementations where the line buffers are double-buffered, both buffers of the line buffers 108 are loaded with packets of data. The token_full signal 466 is used to handle back-pressure and pause a data stream until the application 112 has completed processing one of the stored packets of data.

As shown in FIG. 11, the control circuit 457 includes an incrementer/decrementer 461 that receives the packet_write_done signal 458, the constant value "1", the packet_read_done signal 459, and the output of a multiplexer 465. The multiplexer 465 receives the output of the incrementer/decrementer 461 and the constant value "0". A reset signal 463 is provided to the selection input of the multiplexer 465. The output of the multiplexer 465 is input to a token register 460. The token register 460 is configured for storage of a value indicative of the number of available tokens. Reading a value from the token register 460 is controlled by the enable signal 462. The value read from the token register 460 is input to a plurality of comparators to determine which of the status indication signals the control logic 457 outputs.

The value read from the token register 460 is input to the comparator 464 to determine if the number of available tokens is equal to two. If the number of available tokens is equal to two, then the control logic 457 outputs the token_full signal 466. The value read from the token register 460 is input to the comparator 468 to determine if the number of available tokens greater than zero. If the number of available tokens is greater than zero, then the control logic 457 outputs the token_valid signal 470. The value read from the token register 460 is input to the comparator 472 to determine if the number of available tokens is equal to zero. If the number of available tokens is equal to zero, then the control logic 457 outputs the token_empty signal 474.

When a packet of data is loaded in the line buffers 108, the request generator circuit 110 passes a token that notifies the application 112 that a packet of data is ready for processing. Subsequently, the application 112 can traverse the line buffers 108 to access the data elements of an IFM sub-volume. The disclosed approaches enable a fluent dataflow while reducing control overhead. The size (M) of the line buffers 108 can be adjusted to improve the balance between the bandwidth of the external memory 102 and the bandwidth of the application 112 (e.g., an array of MAC circuits).

Figure 12:
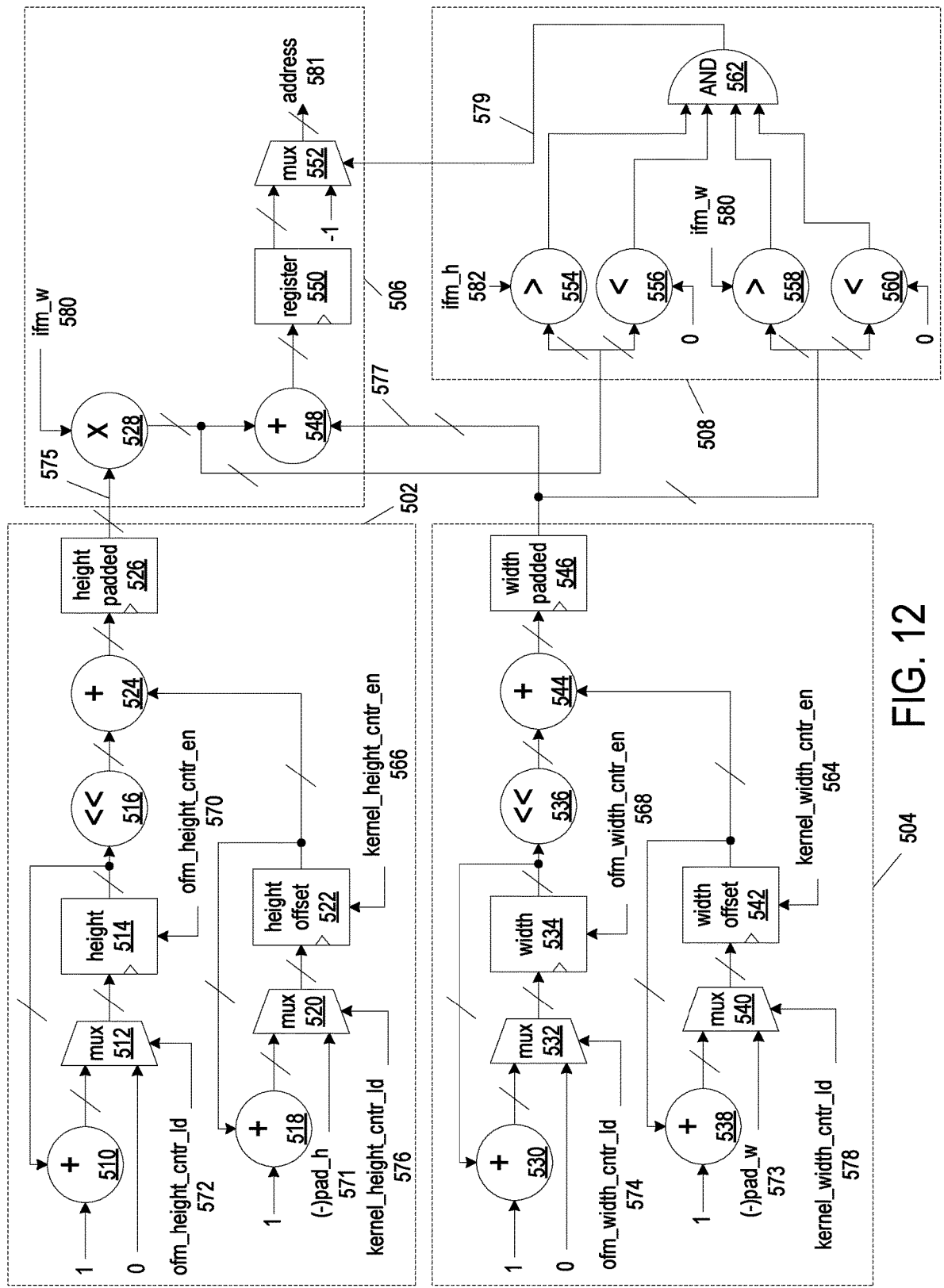
FIG. 12 shows a block diagram of exemplary circuitry of the pixel iterator circuit of FIG. 1.

FIG. 12 shows a block diagram of exemplary circuitry of the pixel iterator circuit 111 of FIG. 1. The pixel iterator circuit 111 includes a height traversal circuit 502, a width traversal circuit 504, and an address generation circuit 506. At least one implementation of the present disclosure includes a boundary check circuit 508. Although the disclosed approaches can be used in other applications, the circuitry shown in FIG. 12 is described with respect to image processing.

The height traversal circuit 502 includes height register 514 that stores values ranging between zero and the height (ofm_h) of a 2-D OFM. The height (ofm_h) of the OFM is defined by (ifm_h+2*pad_h−k_h)/stride+1, where ifm_h is the height of the 2-D plane of an IFM sub-volume, pad_h is the height of the padding on the top and bottom edges of the IFM, k_h is the height of the kernel, and stride is the stride for traversing the 2-D plane. Reading a value from the height register 514 is enabled by control signal ofm_height_cntr_en 570. Selection of the value written to the height register 514 is controlled by the load control signal ofm_height_cntr_ld 572 to multiplexer 512. Initially, the control signal ofm_height_cntr_ld 572 selects the input of the multiplexer 512 having the constant value zero. Subsequently, the control signal ofm_height_cntr_ld 572 selects an input of the multiplexer 512 that is the value read from the height register 514 incremented by one via adder 510. The incremented value is written to the height register 514.

The value read from the height register 514 is left-shifted by log 2(stride) via left-shifter 516 to perform a vertical stride. The example uses a stride value that is a power of two; however, a different multiplier can be used.

The height traversal circuit 502 includes height_offset register 522 that stores values ranging between the negated height (−pad_h) of the padding and the height of the kernel minus the height of the padding (k_h−pad_h). Reading a value from the height_offset register 522 is enabled by control signal kernel_height_cntr_en 566. Selection of the value written to the height_offset register 522 is controlled by the load control signal kernel_height_cntr_ld 576 to multiplexer 520. Initially, the control signal kernel_height_cntr_ld 576 selects an input of the multiplexer 520 having the negated height (−pad_h) 571 of the padding. Subsequently, the control signal kernel_height_cntr_ld 576 selects an input of the multiplexer 520 that is the value read from the height_offset register 522 incremented by one via adder 518 until the height of the kernel minus the height of the padding (k_h−pad_h) is reached. Subsequently, the control signal kernel_height_cntr_ld 576 selects an input of the multiplexer 520 having the height (pad_h) 571 of the pad. For each element (e.g., pixel) of the OFM traversed by the height register 514, values stored in the height_offset register 522, which span the height (k_h) of the kernel, are traversed.

Vertical traversal of the 2-D plane of an IFM sub-volume includes summation of a value stored in the height register 514 and a value stored in the height_offset register 522 via adder 524. The result of the summation is the height traversal location 575 of a data element of the 2-D plane and is stored in height_padded register 526.

The width traversal circuit 504 includes width register 534 that stores values ranging between zero and the width (ofm_w) of the OFM. The width (ofm_w) of the OFM is defined by (ifm_w+2*pad_w−k_w)/stride+1, where ifm_w is the width of the 2-D plane of an IFM sub-volume, pad_w is the width of the padding on the left and right edges of the 2-D plane, k_w is the width of the kernel, and stride is the stride for traversing the 2-D plane. Reading a value from the width register 534 is enabled by control signal ofm_width_cntr_en 568. Selection of the value written to the width register 534 is controlled by the load control signal ofm_width_cntr_Id 574 to multiplexer 532. Initially, the control signal ofm_width_cntr_Id 574 selects the input of the multiplexer 532 having the constant value zero. Subsequently, the control signal ofm_width_cntr_Id 574 selects an input of the multiplexer 532 that is the value read from the width register 534 incremented by one via adder 530. The incremented value is written to the width register 534.

The value read from the width register 534 is left-shifted by log 2(stride) via left-shifter 536 to perform a horizontal stride. The example uses a stride value that is a power of two; however, a different multiplier can be used.

The width traversal circuit 504 includes width_offset register 542 that stores values ranging between the negated width (−pad_w) of the padding and the width of the kernel minus the width of the padding (k_w−pad_w). Reading a value from the width_offset register 542 is enabled by control signal kernel_width_cntr_en 564. Selection of the value written to the width_offset register 542 is controlled by the load control signal kernel_width_cntr_Id 578 to multiplexer 540. Initially, the control signal kernel_width_cntr_Id 578 selects an input of the multiplexer 540 having the negated width (pad_w) 573 of the padding. Subsequently, the control signal kernel_width_cntr_Id 578 selects an input of the multiplexer 540 that is the value read from the width_offset register 542 incremented by one via adder 538 until the width of the kernel minus the width of the padding (k_w−pad_w) is reached. Subsequently, the control signal kernel_width_cntr_Id 578 selects an input of the multiplexer 540 having the width (pad_w) 573 of the padding. For each element (e.g., pixel) of the OFM traversed by the width register 534, values stored in the width_offset register 542, which span the width (k_w) of the kernel, are traversed.

Horizontal traversal of the 2-D plane of an IFM sub-volume includes summation of a value stored in the width register 534 and a value stored in the width_offset register 542 via adder 544. The output of the adder 544 is the width traversal location 577 of a data element of the 2-D plane, and is stored in width_padded register 546.

Because a 2-D plane of an IFM sub-volume is unrolled and stored as a one-dimensional array in one of the N line buffers 108, the address for a data element of the 2-D plane in the line buffer generated by the pixel iterator circuit 111 is a combination of the height traversal location 575 and the width traversal location 577. The address is defined by height_padded*ifm_w+width_padded, where height_padded is the height traversal location 575 read from the height_padded register 526 and width_padded is the width traversal location 577 read from the width_padded register 546. The address generation circuit 506 includes multiplier 528 that performs the multiplication of the height traversal location 575 with the width (ifm_w) 580 of the IFM and adder 548 that performs the summation of the output of multiplier 528 and the width traversal location 577. The result of the adder 548 is stored in register 550.

The address generated by the pixel iterator circuit 111 may be beyond the height (ifm_h) 582 of the 2-D plane and/or the width (ifm_w) 580 of the 2-D plane. If a data element is "out-of-bounds," then a constant value (e.g., zero) is inserted to pad the 2-D plane at the boundary. The boundary check circuit 508 includes comparators 554, 556, 558, and 560 to determine whether the height traversal location 575 is beyond the height (ifm_h) 582 of the 2-D plane and determine whether the width traversal location 577 is beyond the width (ifm_w) 580 of the 2-D plane. The comparator 554 determines whether the height traversal location 575 is greater than the height (ifm_h) 582 of the IFM. The comparator 556 determines whether the height traversal location 575 is less than zero. The comparator 558 determines whether the width traversal location 577 is greater than the width (ifm_w) 580 of the IFM. The comparator 560 determines whether the width traversal location 577 is less than zero. The outputs of the comparators 554, 556, 558, and 560 are input to AND gate 562. The output 579 of the AND gate 562 is provided to the selection input of multiplexer 552 of the address generation circuit 506. If any of the comparisons are true (e.g., any of the outputs are logic "1"), the multiplexer 552 selects an input having a constant value (e.g., −1) and outputs the constant value as the address. The address being −1, for example, indicates to the application 112 that the data element corresponding to the address is outside the boundary of the 2-D plane.

Figure 13:
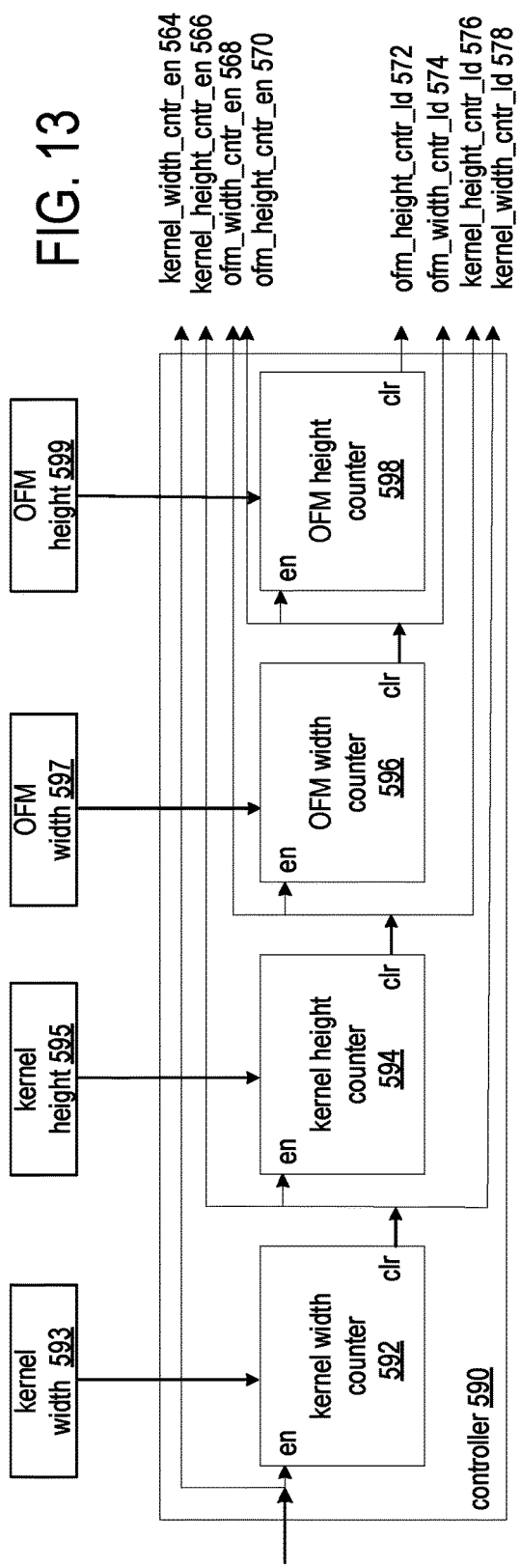
FIG. 13 shows a block diagram of an exemplary controller configured to generate control signals input to the pixel iterator circuit of FIG. 12 in an exemplary first traversal order based on parameter values.

FIG. 13 shows a block diagram of an exemplary controller 590 configured to generate control signals input to the pixel iterator circuit 111 of FIG. 12 in an exemplary first traversal order based on parameter values. The controller 590 can be analogous to or a component of the control circuit 113 shown in FIG. 1. The controller 590 includes counters for the parameters of the expansion of a 2-D plane of an IFM sub-volume. The parameters include the width (k_w) of the kernel; the height (k_h) of the kernel; the width (ofm_w) of the 2-D OFM; and the height (ofm_h) of the 2-D OFM. The width (ofm_w) of the OFM is defined by (ifm_w+2*pad_w−k_w)/stride+1, where ifm_w is the width of the 2-D plane, pad_w is the width of the padding on the left and right edges of the 2-D plane, and stride is the stride for traversing the 2-D plane. The height (ofm_h) of the 2-D OFM is defined by (ifm_h+2*pad_h−k_h)/stride+1, where ifm_h is the height of the 2-D plane and pad_h is the height of the padding on the top and bottom edges of the 2-D plane. The values of the width (k_w) of the kernel; the height (k_h) of the kernel; the width (ofm_w) of the OFM; and the height (ofm_h) of the 2-D OFM are represented by registers that store the kernel width 593, kernel height 595, OFM width 597, and OFM height 599, respectively.

The value of each counter of the controller 590 begins at zero and resets when the value reaches an upper bound, which is based on the parameters. The kernel width counter 592 counts from zero to the kernel width 593, the kernel height counter 594 counts from zero to the kernel height 595, the OFM width counter 596 counts from zero to the OFM width 597, and the OFM height counter 598 counts from zero to the OFM height 597. The outputs of the counters are the control signals provided to the pixel iterator circuit 111. The kernel width counter 592 outputs the enable control signal kernel_width_cntr_en 564 and the load control signal kernel_width_cntr_Id 578; the kernel height counter 594 outputs the enable control signal kernel_height_cntr_en 566 and the load control signal kernel_height_cntr_Id 572; the OFM width counter 596 outputs the enable control signal ofm_width_cntr_en 568 and the load control signal ofm_width_cntr_Id 574; and the OFM height counter 598 outputs the enable control signal ofm_height_cntr_en 570 and the load control signal ofm_height_cntr_Id 572.

The counters of the controller 590 are coupled to one another in a chain so that when one counter resets, as indicated by a clear output signal at the "clr" pin, the next counter increments by one. The clear output of the kernel width counter 592 is coupled to an enable input of kernel height counter 594. The clear output of the kernel height counter 594 is coupled to an enable input of OFM width counter 596. The clear output of the OFM width counter 596 is coupled to an enable input of OFM height counter 598.

As arranged in the controller 590, the kernel width counter 592 counts from zero to the kernel width 593 and then resets. In response to the kernel width counter 592 resetting, the kernel height counter 594 counts from zero to the kernel height 595 and then resets. In response to the kernel height counter 594 resetting, the OFM width counter 596 counts from zero to the OFM width 597 and then resets. In response to the OFM width counter 596 resetting, the OFM height counter 598 counts from zero to the OFM height 599 and then resets. The controller 590 effectively counts according to the following pseudocode:

for (int h=0, h<ofm_h, h++)
  for (int w=0, w<ofm_w, w++)
    for (int kh=0, kh<k_h, kh++)
      for (int kw=0, kw<k_w, kw++)

The arrangement of the counters can be changed to alter the traversal order of the pixel iterator circuit 111. The pixel iterator circuit 111 supports any traversal order and any chain order of the counters.

Figure 14:
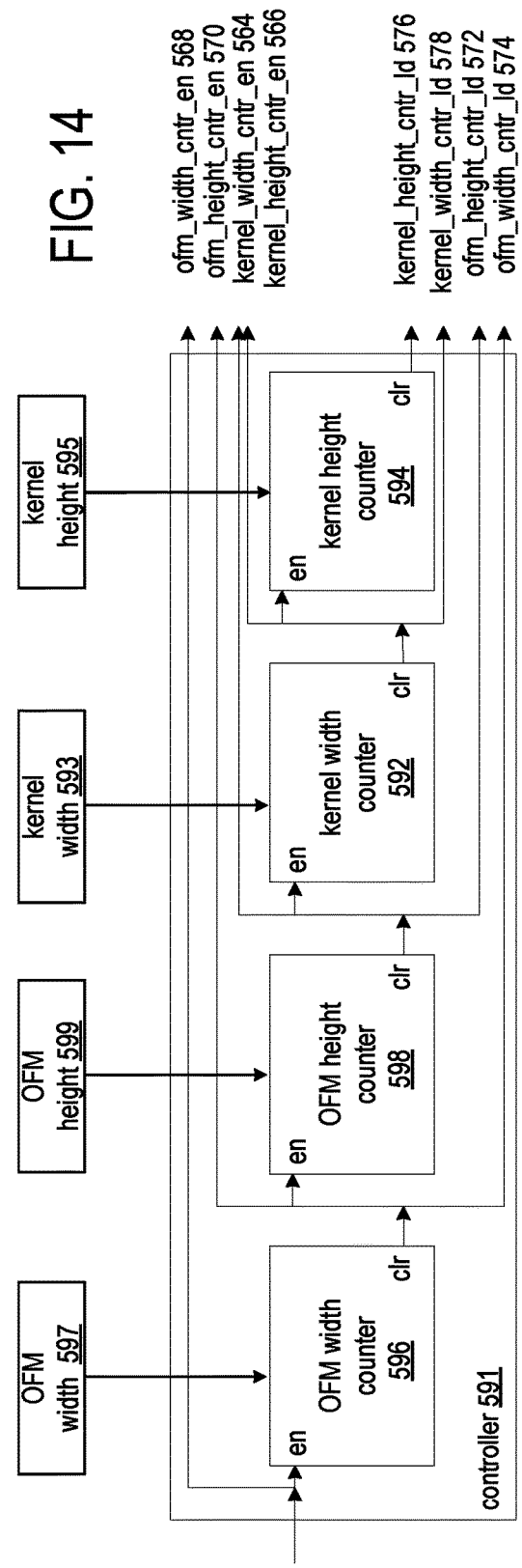
FIG. 14 shows a block diagram of an exemplary controller configured to generate control signals input to the pixel iterator circuit of FIG. 12 in an exemplary second traversal order based on parameter values.

FIG. 14 shows a block diagram of an exemplary controller 591 configured to generate control signals input to the pixel iterator circuit 111 of FIG. 12 in an exemplary second traversal order based on parameter values. The controller 591 can be analogous to or a component of the control circuit 113 shown in FIG. 1. Compared to the controller 590 of FIG. 13, the controller 591 includes the same counters as the controller 590 (the kernel width counter 592, the kernel height counter 594, the OFM width counter 596, and the OFM height counter 598) but arranged in a different chain order.

The counters of the controller 591 are coupled to one another in a chain so that when one counter resets, as indicated by the clear output signal at the "clr" pin, the next counter increments by one. The clear output of the OFM width counter 596 is coupled to an enable input of OFM height counter 598. The clear output of the OFM height counter 598 is coupled to an enable input of the kernel width counter 592. The clear output of the kernel width counter 592 is coupled to an enable input of kernel height counter 594.

As arranged in the controller 591, the OFM width counter 596 counts from zero to the OFM width 597 and then resets. In response to the OFM width counter 596 resetting, the OFM height counter 598 counts from zero to the OFM height 599 and then resets. In response to the OFM height counter 598 resetting, the kernel width counter 592 counts from zero to the kernel width 593 and then resets. In response to the kernel width counter 592 resetting, the kernel height counter 594 counts from zero to the kernel height 595 and then resets. The controller 591 effectively counts according to the following pseudocode:

for (int kh=0, kh<k_h, kh++)
  for (int kw=0, kw<k_w, kw++)
    for (int h=0, h<ofm_h, h++)
      for (int w=0, w<ofm_w, w++)

Figures 15A, 15B:
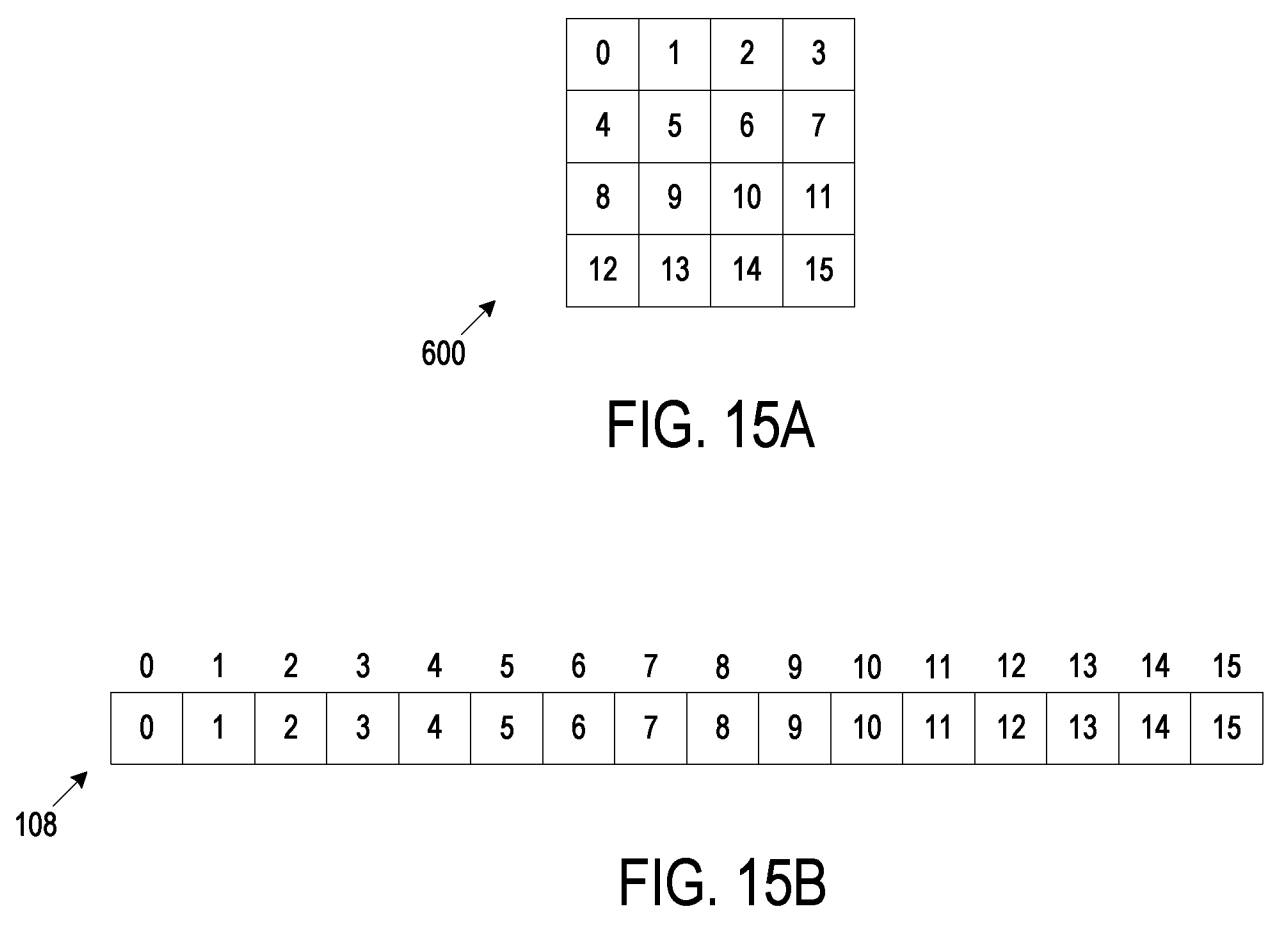

FIG. 15A shows an exemplary 2-D plane 600 of an IFM sub-volume. The 2-D plane 600 is 4×4 and includes sixteen data elements indexed from 0 to 15. Each data element of the 2-D plane 600 can correspond to a pixel of an input image in an exemplary application.

FIG. 15B shows an exemplary arrangement of the data elements of the 2-D plane 600 of FIG. 15A in one of the N line buffers 108 of FIG. 1. The line buffer 108 stores the data elements of the 2-D plane 600 in row-major order in sequential addresses of the line buffer 108. The 2-D plane 600 is unrolled by rows so that data element 0 of the 2-D plane 600 is stored at address 0 of the line buffer 108, data element 1 of the 2-D plane 600 is stored at address 1 of the line buffer 108, . . . , and data element 15 of the 2-D plane 600 is stored at address 15 of the line buffer 108.

Figure 16A:
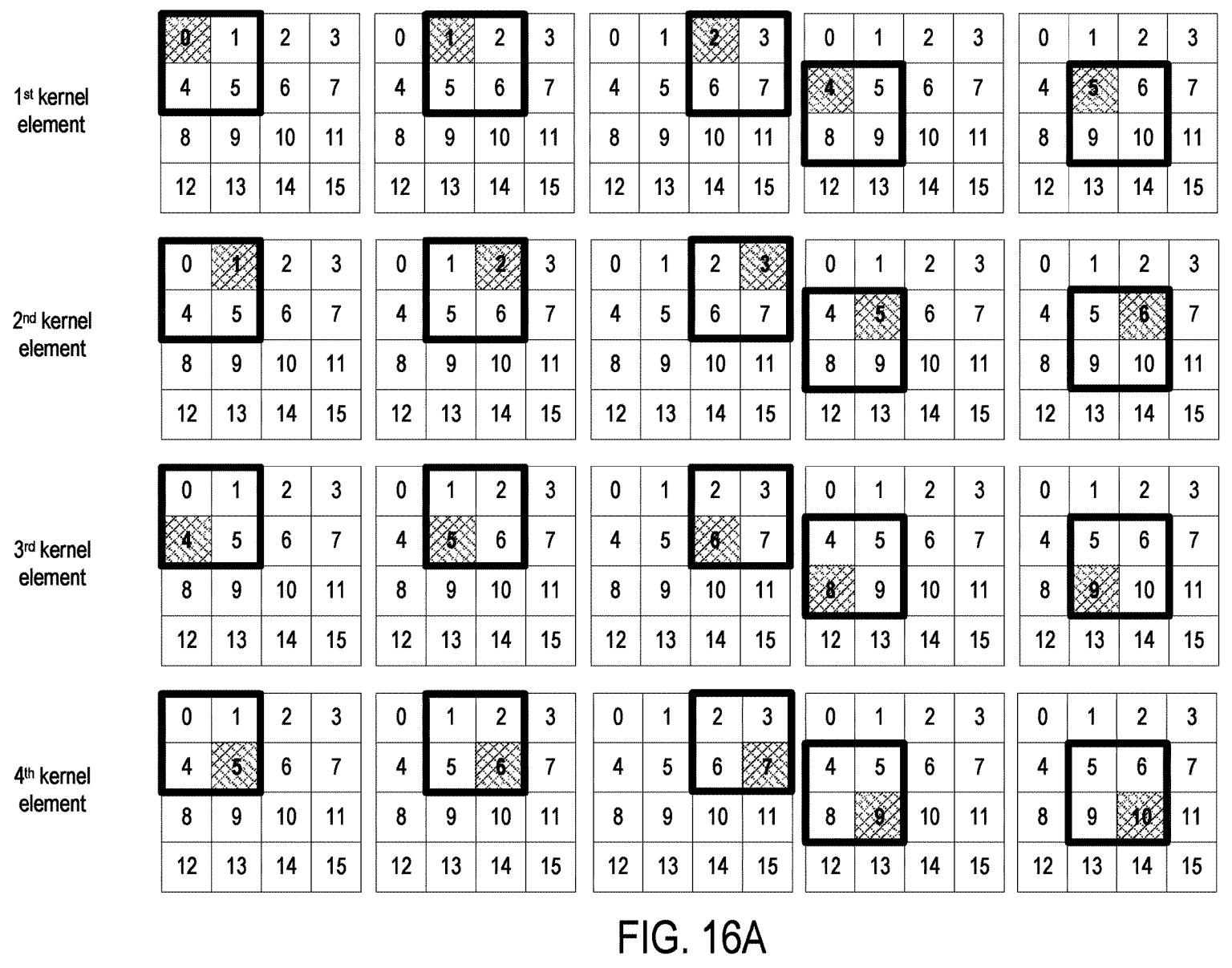
Figure 16B:
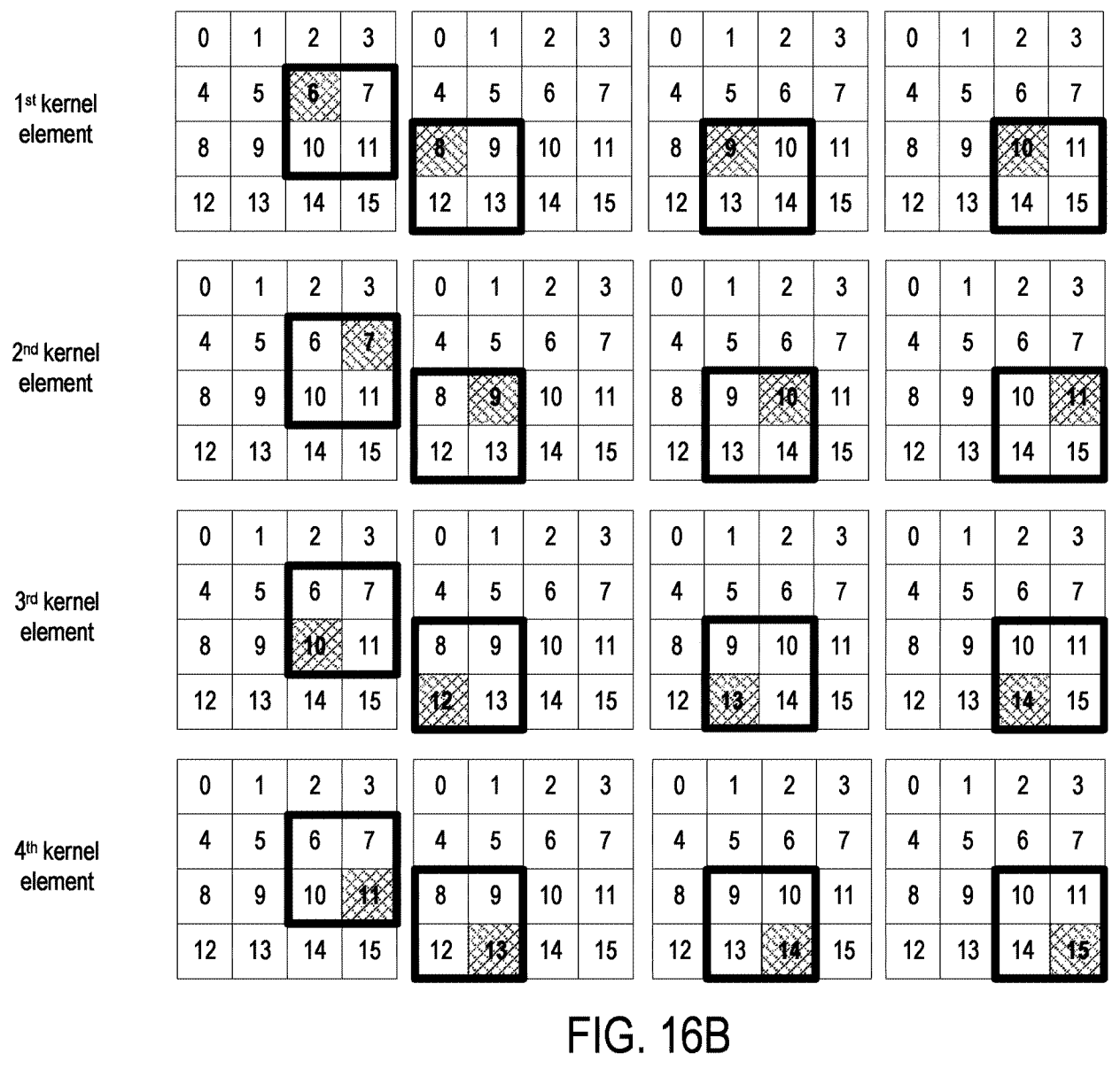

FIGS. 16A and 6B show an exemplary traversal of the 2-D plane 600 of an IFM sub-volume of FIG. 15A by the pixel iterator circuit 111 of FIG. 12. Each column of FIGS. 16A and 16B can represent a set of MAC operations (e.g., a convolution operation) performed on elements of the 2-D plane 600 and a 2×2 kernel with a stride of one (stride=1). Because the height and width of the kernel are two, the height and width of the 2-D plane 600 are four, and the stride is one, the height and width of the 2-D OFM are three (a 3×3 2-D OFM). Accordingly, FIGS. 16A and 16B show nine columns (the first five columns in FIG. 16A, the last four columns in FIG. 16B) corresponding to the nine sets of MAC operations necessary to generate the nine elements of the OFM. Each element of the OFM can correspond to a pixel of an output image.

The bold square in FIGS. 16A and 16B represents the 2×2 kernel. The shaded element of the 2-D plane 600 with a bold data element number represents the multiplication of the shaded element of the kernel with the shaded data element of the 2-D plane 600. For example, in one implementation, a first set of MAC operations is represented by the first column of FIG. 6A that includes multiplying the element at the first column and first row of the kernel with data element 0 of the 2-D plane 600, multiplying the element at the second column and first row of the kernel with data element 1 of the 2-D plane 600, multiplying the element at the first column and second row of the kernel with data element 4 of the 2-D plane 600, and multiplying the element at the second column and second row of the kernel with data element 5 of the 2-D plane 600. A ninth set of MAC operations is represented by the last column of FIG. 16B that includes multiplying the element at the first column and first row of the kernel with data element 10 of the 2-D plane 600, multiplying the element at the second column and first row of the kernel with data element 11 of the 2-D plane 600, multiplying the element at the first column and second row of the kernel with data element 14 of the 2-D plane 600, and multiplying the element at the second column and second row of the kernel with data element 15 of the 2-D plane 600.

Referring back to FIG. 13 and traversal order associated with the controller 590, the width of the kernel is traversed first, the height of the kernel is traversed second, the width of the OFM is traversed third, and the height of the OFM is traversed fourth. Accordingly, the pixel iterator circuit 111 generates the addresses for all the data elements of the 2-D plane 600 for one set of MAC operations before generating the addresses for all the data elements of the 2-D plane 600 for another set of MAC operations. The pixel iterator circuit 111 generates the addresses for the first set of MAC operations that outputs the element at the first column and first row of the 2-D OFM, then the addresses for the second set of MAC operations that outputs the element at the second column and first row of the 2-D OFM, then the addresses for the third set of MAC operations that outputs the element at the third column and first row of the 2-D OFM, then the addresses for the fourth set of MAC operations that outputs the element at the first column and second row of the 2-D OFM, and so on.

Referring back to FIG. 14 and traversal order associated with the controller 591, the width of the OFM is traversed first, the height of the OFM is traversed second, the width of the kernel is traversed third, and the height of the kernel is traversed fourth location. Accordingly, the pixel iterator circuit 111 generates the addresses for all the data elements of the 2-D plane 600 for one set of MAC operations using the same element of a kernel before generating the addresses for all the data elements of the 2-D plane 600 for another set of MAC operations using a different element of the kernel. As indicated in FIGS. 16A and 16B, the first row represents a first set of MAC operations all using the first element at the first column and first row of the kernel, the second row represents a second set of MAC operations all using the second element at the second column and first row of the kernel, the third row represents a third set of MAC operations all using the third element at the first column and second row of the kernel, and the fourth row represents a fourth set of MAC operations all using the fourth element at the second column and second row of the kernel. The sequence of addresses associated with the controller 591 is element 0, element 1, element 2, element 4, element 5, element 6, element 8, element 9, element 10, . . . , element 11, element 13, element 14, element 15. This traversal order reduces the weight volume bandwidth and the latency of the CNN. As explained above in association with FIG. 4, the accumulator circuit 117 can enable post-processing of 2-D OFMs in pipeline while storing the partial accumulations in the BRAM 227. In contrast to some previous approaches that perform MAC operations using a sliding window to process one element of a 2-D OFM at a time, the disclosed approaches include using an element of a kernel to partially contribute towards as many as disjointed MAC operations that exists in an IFM sub-volume before using another element of a kernel.

Figure 17:
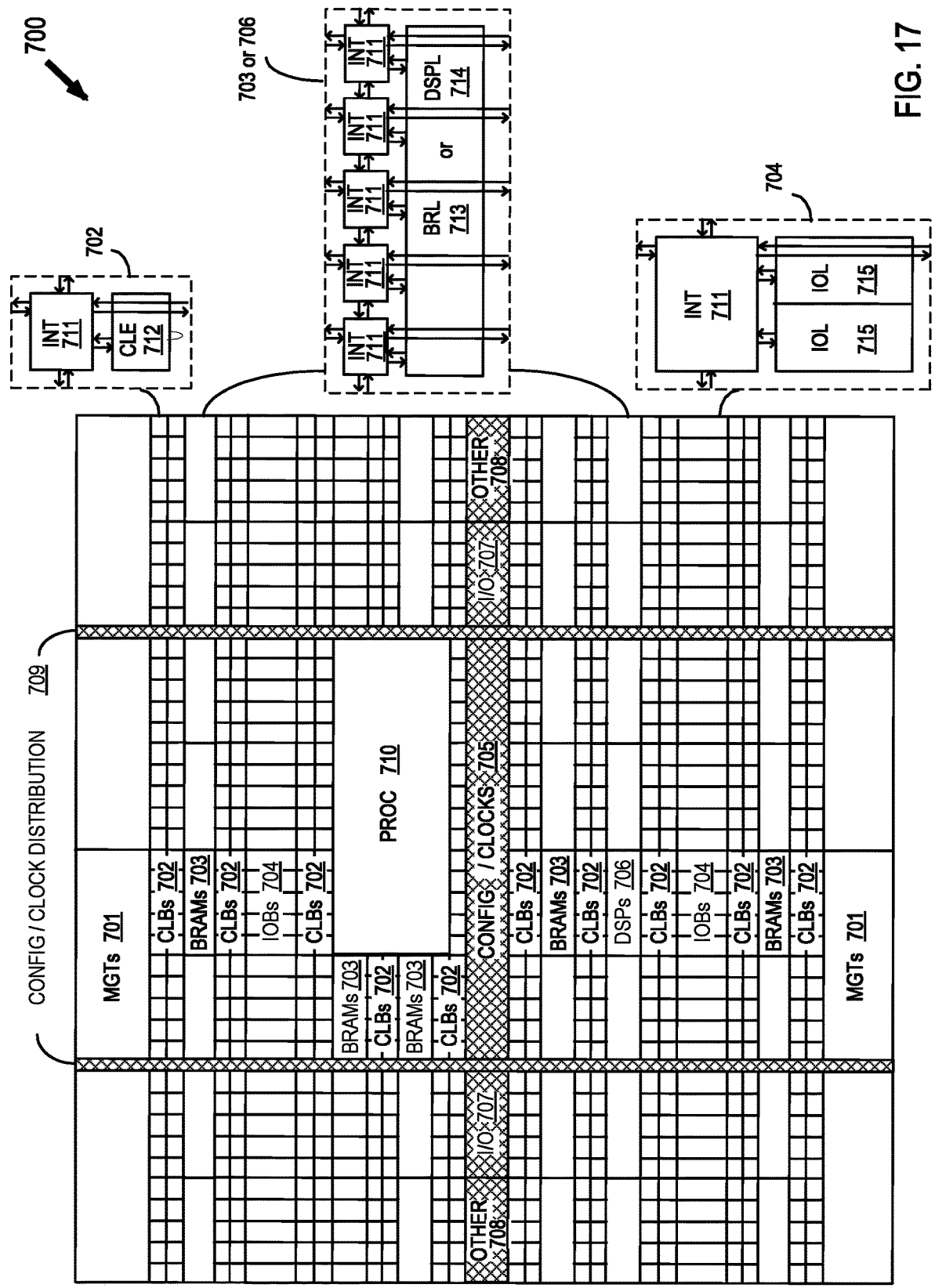
FIG. 17 shows a programmable integrated circuit (IC) on which the disclosed circuits and processes may be implemented.

FIG. 17 shows a programmable integrated circuit (IC) 700 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 17 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 17.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

A columnar area near the center of the die (shown shaded in FIG. 17) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 17 include additional logic blocks that disrupt the regular columnar structure making up a large part of the programmable IC. The additional logic blocks can be programmable blocks and/or dedicated logic. For example, the processor block PROC 710 shown in FIG. 17 spans several columns of CLBs and BRAMs.

Note that FIG. 17 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 17 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for formatting data for performing convolution operations. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:
1. A circuit arrangement, comprising:
a request generator circuit configured to read a plurality of IFM sub-volumes of data elements of a three-dimensional (3D) input feature map (IFM) from a memory and store data elements of an unprocessed one of the IFM sub-volumes in one of a plurality of N line buffers, each line buffer configured for storage of M data elements; and
a pixel iterator circuit coupled to the line buffers and configured to generate a sequence of addresses for reading the data elements from the line buffers based on a sequence of IFM height values and a sequence of IFM width values.

2. The circuit arrangement of claim 1, further comprising an array of multiply-and-accumulate (MAC) circuits coupled to the line buffers and configured to perform multiple consecutive MAC operations on the data elements read from the line buffers and elements of a kernel, wherein the array of MAC circuits is configured to generate 2-D output feature map (OFM) planes of a 3-D OFM in a data format of the data elements of the unprocessed one of the IFM sub-volumes.

3. The circuit arrangement of claim 2, wherein each of the MAC circuits of the array includes:
a processor circuit;
a first register coupled to the processor circuit and configured for storage of a first element of the kernel; and
a second register coupled to the processor circuit and configured for storage of a second element of the kernel; and
wherein the array of MAC circuits is configured to:
perform first MAC operations on the data elements and the first element of the kernel in response to the second register being empty; and
perform second MAC operations on the data elements and the second element of the kernel in response to the first register being empty.

4. The circuit arrangement of claim 1, further comprising a control circuit coupled to the pixel iterator circuit, wherein:
the control circuit includes a kernel width counter, a kernel height counter, an output feature map (OFM) width counter, and an OFM height counter;
the kernel width counter is configured to repetitively count up to a kernel width and reset;
the kernel height counter is configured to repetitively count up to a kernel height and reset;
the OFM width counter is configured to repetitively count up to an OFM width and reset;
the OFM height counter is configured to repetitively count up to an OFM height and reset; and
the pixel iterator circuit is configured to generate the sequence of addresses in response to clear output signals from the kernel width counter, kernel height counter, OFM width counter, and OFM height counter.

5. The circuit arrangement of claim 4, wherein the sequence of addresses includes addresses of the data elements of the unprocessed one of the IFM sub-volumes to be multiplied by the first element of the kernel followed in succession by addresses of the data elements of the unprocessed one of the IFM sub-volumes to be multiplied by the second element of the kernel.

6. The circuit arrangement of claim 1, wherein the request generator circuit is configured to:
divide the 3-D IFM into the plurality of IFM sub-volumes based on values of N and M, and dimensions of the 3-D IFM; and
read data elements from the memory at addresses of the unprocessed one of the IFM sub-volumes.

7. The circuit arrangement of claim 6, wherein the request generator circuit is configured to designate, in response to a depth of the 3-D IFM being greater than the value of N, at least one of the IFM sub-volumes to include N 2-D planes of the 3-D IFM.

8. The circuit arrangement of claim 6, wherein the request generator circuit is configured to designate, in response to a 2-D plane of the 3-D IFM including more than M data elements, the IFM sub-volumes to include a subset of data elements of the 2-D plane, based on at least one dimension of the 3-D IFM, at least one dimension of a kernel, and a stride.

9. The circuit arrangement of claim 6, further comprising:
an array of multiply-and-accumulate (MAC) circuits coupled to the line buffers and configured to perform multiple consecutive MAC operations on the data elements read from the line buffers and elements of a kernel; and
an accumulator circuit coupled to the array of MAC circuits, the accumulator circuit configured to accumulate from each column of the array of MAC circuits, output values from the column and generate at least a portion of a 3-D output feature map (OFM) from accumulated output values.

10. The circuit arrangement of claim 9, wherein:
the array of MAC circuits is a first instance of the array of MAC circuits coupled to the accumulator circuit;
the circuit arrangement further comprises a second instance of the array of MAC circuits coupled to the accumulator circuit;
the first instance of the array of MAC circuits is configured to perform multiple consecutive MAC operations on data elements of a first one of the IFM sub-volumes and respective elements of the kernel; and
the second instance of the array of MAC circuits is configured to perform multiple consecutive MAC operations on data elements of a second one of the IFM sub-volumes and the respective elements of the kernel.

11. The circuit arrangement of claim 9, wherein the accumulator circuit is configured to store first accumulated outputs in a first buffer while intermediary values from time-multiplex accumulating second outputs of the array of MAC circuits are loaded in a second buffer.

12. The circuit arrangement of claim 1, wherein the pixel iterator is adaptable to different sizes of convolutional neural networks (CNNs) and is further configured to generate the sequence of addresses for reading the data elements from the line buffers and providing the data elements to a plurality of instances of an array of multiply-and-accumulate (MAC) circuits coupled to the line buffers.

13. A method, comprising:
storing a three-dimensional (3-D) input feature map (IFM) in a memory;
reading by a request generator circuit, a plurality of IFM sub-volumes of data elements of the 3-D IFM from the memory;
storing the data elements of an unprocessed one of the IFM sub-volumes in one of a plurality of N line buffers, each line buffer configured for storage of M data elements;
generating by a pixel iterator circuit, read requests to the line buffers, the read requests containing a sequence of addresses referencing the data elements in the line buffers based on a sequence of IFM height values and a sequence of IFM width values; and
performing multiple consecutive MAC operations by an array of multiply-and-accumulate (MAC) circuits on the data elements read from the line buffers and respective elements of a kernel.

14. The method of claim 13, wherein each of the MAC circuits of the array includes a processor circuit, and the method further comprising:
storing a first element of the kernel in a first register coupled to the processor circuit;
storing a second element of the kernel in a second register coupled to the processor circuit;

performing by the array of MAC circuits, first MAC operations on the data elements read from the line buffers and the first element of the kernel in response to the second register being empty; and performing by the array of MAC circuits, second MAC operations on the data elements read from the line buffers and the second element of the kernel in response to the first register being empty.

15. The method of claim 13, further comprising:
repetitively counting up to a kernel width and resetting by a kernel width counter;
repetitively counting up to a kernel height and resetting by a kernel height counter;
repetitively counting up to an OFM width and resetting by an output feature map (OFM) width counter;
repetitively counting up to an OFM height and resetting by an OFM height counter;
wherein the generating the sequence of addresses is responsive to clear output signals from the kernel width counter, kernel height counter, OFM width counter, and OFM height counter, and the generating the sequence of addresses includes generating addresses of all of the data elements of the unprocessed one of the IFM sub-volumes to be multiplied by the first element of the kernel followed in succession by addresses of the data elements of the unprocessed one of the IFM sub-volumes to be multiplied by the second element of the kernel.

16. The method of claim 13, further comprising:
dividing the 3-D IFM into a plurality of IFM sub-volumes based on values of N and M, and dimensions of the 3-D IFM by the request generator circuit;
reading data elements at addresses of an unprocessed one of the IFM sub-volumes by the request generator circuit;
storing the data elements of the unprocessed one of the IFM sub-volumes in the N line buffers by the request generator circuit; and
designating by the request generator circuit, in response to a depth of the 3-D IFM being greater than the value of N, at least one of the IFM sub-volumes to include N 2-D planes of the 3-D IFM.

17. The method of claim 13, further comprising:
dividing the 3-D IFM into a plurality of IFM sub-volumes based on values of N and M, and dimensions of the 3-D IFM by the request generator circuit;
reading data elements at addresses of an unprocessed one of the IFM sub-volumes by the request generator circuit;
storing the data elements of the unprocessed one of the IFM sub-volumes in the N line buffers by the request generator circuit; and
designating by the request generator circuit, in response to a 2-D plane of the 3-D IFM including more than M data elements, the IFM sub-volumes to include a subset of data elements of the 2-D plane, based on at least one dimension of the 3-D IFM, at least one dimension of a kernel, and a stride.

18. A circuit arrangement, comprising:
a request generator circuit configured to read a plurality of IFM sub-volumes of data elements of a three-dimensional (3D) input feature map (IFM) from a memory and store data elements of an unprocessed one of the IFM sub-volumes in one of a plurality of N line buffers, each line buffer configured for storage of M data elements;
a pixel iterator circuit coupled to the line buffers and configured to generate a sequence of addresses for reading the data elements from the line buffers based on a sequence of IFM height values and a sequence of IFM width values;
a plurality of instances of an array of multiply-and-accumulate (MAC) circuits coupled to the line buffers, each instance of an array of MAC circuits configured to perform multiple consecutive MAC operations on the data elements read from the line buffers and elements of a kernel.

19. The circuit arrangement of claim 18, wherein:
a first instance of the plurality of instances of MAC circuits is configured to perform multiple consecutive MAC operations on the data elements of a 2D plane of an IFM sub-volume;
a second instance of the plurality of instances of MAC circuits is configured to perform multiple consecutive MAC operations on the same data elements of the 2D plane of the same IFM sub-volume as the first instance; and
wherein the first instance and second instance in performing the MAC operations use either different elements of one kernel or elements of different kernels.

20. The circuit arrangement of claim 18, wherein:
a first instance of the plurality of instances of MAC circuits is configured to perform multiple consecutive MAC operations on the data elements of a first 2D plane of an IFM sub-volume;
a second instance of the plurality of instances of MAC circuits is configured to perform multiple consecutive MAC operations on data elements of a second 2D plane of the IFM sub-volume; and
wherein the first instance and second instance in performing the MAC operations use the same elements of one kernel.

* * * * *